(12) United States Patent
Bekmann et al.

(10) Patent No.: US 11,995,715 B1
(45) Date of Patent: *May 28, 2024

(54) CAPITAL LOAN OPTIMIZATION

(71) Applicant: Block, Inc., San Francisco, CA (US)

(72) Inventors: Joachim Bekmann, San Francisco, CA (US); Nicholas Halpern, Oakland, CA (US)

(73) Assignee: BLOCK, INC., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/515,677

(22) Filed: Nov. 1, 2021

Related U.S. Application Data

(62) Division of application No. 16/022,397, filed on Jun. 28, 2018, now Pat. No. 11,176,607.

(51) Int. Cl.
| | |
|---|---|
| *G06Q 40/00* | (2023.01) |
| *G06Q 10/04* | (2023.01) |
| *G06Q 20/10* | (2012.01) |
| *G06Q 30/0201* | (2023.01) |
| *G06Q 40/02* | (2023.01) |
| *G06Q 40/03* | (2023.01) |

(52) U.S. Cl.
CPC ............ *G06Q 40/03* (2023.01); *G06Q 10/04* (2013.01); *G06Q 30/0201* (2013.01)

(58) Field of Classification Search
CPC ..... G06Q 40/03; G06Q 10/04; G06Q 30/0201
USPC .......................................................... 705/38
See application file for complete search history.

(56) References Cited

U.S. PATENT DOCUMENTS

| | | |
|---|---|---|
| 6,941,281 B1 | 9/2005 | Johnson |
| 7,630,932 B2 | 12/2009 | Danaher et al. |
| 8,204,779 B1 | 6/2012 | Hughes et al. |
| 8,595,232 B1 | 11/2013 | Azarm et al. |
| 9,727,912 B1 * | 8/2017 | Poursartip .............. G06Q 20/20 |
| 9,786,005 B1 * | 10/2017 | Poursartip ........ G06Q 10/06315 |

(Continued)

FOREIGN PATENT DOCUMENTS

| | | |
|---|---|---|
| WO | 2008/150243 A2 | 12/2008 |
| WO | 2022/226122 A1 | 10/2022 |

OTHER PUBLICATIONS

"Report Information from Dialog", Dialog (Jul. 3, 2021), pp. 1-30.
(Continued)

*Primary Examiner* — Hai Tran
(74) *Attorney, Agent, or Firm* — MATTINGLY & MALUR, PC

(57) ABSTRACT

In some examples, a system may receive first merchant data for a first merchant. For instance, the first merchant data may include one or more merchant characteristics associated with the first merchant. The system may assign the first merchant to a first group of merchants based at least in part on the first merchant sharing at least one of the merchant characteristics with the first group of merchants. The system may use a machine learning model to determine a customized timing at which to provide a loan offer to the first merchant. The customized timing n ay be based at least in part on loan data associated with one or more loans previously offered to the merchants in the first group of merchants. Further, the system may send the loan offer to a computing device of the first merchant based at least in part on the customized timing.

20 Claims, 6 Drawing Sheets

(56) References Cited

U.S. PATENT DOCUMENTS

| | | |
|---|---|---|
| 9,805,338 B1 | 10/2017 | Ghosn et al. |
| 9,892,458 B1 | 2/2018 | Shearer |
| 10,007,953 B1 | 6/2018 | Nathoo et al. |
| 10,019,698 B1 | 7/2018 | Scott et al. |
| 10,445,716 B1 | 10/2019 | Riechers et al. |
| 10,453,086 B1 | 10/2019 | Scott et al. |
| 10,535,054 B1 | 1/2020 | Sptizer et al. |
| 10,628,816 B1 | 4/2020 | Scott et al. |
| 10,692,140 B1 | 6/2020 | Kim et al. |
| 11,107,157 B1 | 8/2021 | Kerof et al. |
| 11,176,607 B1 | 11/2021 | Bekmann et al. |
| 11,250,503 B1 | 2/2022 | Jew et al. |
| 11,317,153 B2 | 4/2022 | Webb et al. |
| 11,379,913 B1 | 7/2022 | Perelli-Minetti et al. |
| 2001/0044756 A1 | 11/2001 | Watkins et al. |
| 2003/0074311 A1 | 4/2003 | Saylors et al. |
| 2003/0163447 A1 | 8/2003 | Sandman |
| 2004/0111361 A1 | 6/2004 | Griffiths et al. |
| 2004/0225545 A1 | 11/2004 | Turner et al. |
| 2004/0225594 A1 | 11/2004 | Nolan, III et al. |
| 2005/0131843 A1 | 6/2005 | Sansone et al. |
| 2006/0015469 A1 | 1/2006 | Whitehouse |
| 2006/0026293 A1 | 2/2006 | Virdi et al. |
| 2006/0161435 A1 | 7/2006 | Atef et al. |
| 2006/0242030 A1 | 10/2006 | Blanchard, Jr. et al. |
| 2007/0150387 A1 | 6/2007 | Seubert et al. |
| 2007/0271178 A1 | 11/2007 | Davis et al. |
| 2007/0288357 A1 | 12/2007 | Holman et al. |
| 2008/0243569 A1 | 10/2008 | Hadden |
| 2009/0112658 A1 | 4/2009 | Mullen et al. |
| 2009/0112659 A1 | 4/2009 | Mullen et al. |
| 2009/0112660 A1 | 4/2009 | Mullen et al. |
| 2009/0112661 A1 | 4/2009 | Mullen et al. |
| 2009/0112662 A1 | 4/2009 | Mullen et al. |
| 2010/0049588 A1 | 2/2010 | Debow |
| 2010/0100464 A1 | 4/2010 | Ellis et al. |
| 2010/0169977 A1 | 7/2010 | Dasher et al. |
| 2011/0178902 A1 | 7/2011 | Imrey et al. |
| 2012/0109820 A1 | 5/2012 | Galit et al. |
| 2012/0233090 A1 | 9/2012 | Tavares et al. |
| 2013/0103592 A1 | 4/2013 | Shenk et al. |
| 2013/0339219 A1 | 12/2013 | Bernheimer et al. |
| 2014/0180826 A1 | 6/2014 | Boal |
| 2014/0229397 A1 | 8/2014 | Fink |
| 2014/0258088 A1 | 9/2014 | Belarj |
| 2014/0351116 A1 | 11/2014 | Hoff |
| 2014/0358766 A1 | 12/2014 | Nayyar et al. |
| 2015/0026035 A1* | 1/2015 | Showalter ............ G06Q 40/06 705/38 |
| 2015/0039490 A1 | 2/2015 | Forrester et al. |
| 2015/0095210 A1 | 4/2015 | Grech et al. |
| 2015/0100475 A1 | 4/2015 | Cummings et al. |
| 2015/0149333 A1 | 5/2015 | Yaplee et al. |
| 2015/0371335 A1 | 12/2015 | Liptak et al. |
| 2016/0275186 A1 | 9/2016 | Wansley et al. |
| 2016/0358161 A1 | 12/2016 | Cobban et al. |
| 2017/0098216 A1 | 4/2017 | Studnitzer |
| 2017/0238039 A1 | 8/2017 | Sabattini |
| 2017/0289589 A1 | 10/2017 | Koumchatzky et al. |
| 2018/0040064 A1 | 2/2018 | Grigg et al. |
| 2018/0053253 A1 | 2/2018 | Gokhale et al. |
| 2018/0192108 A1 | 7/2018 | Lyons et al. |
| 2018/0211342 A1 | 7/2018 | Hoareau |
| 2018/0225648 A1 | 8/2018 | Robinson et al. |
| 2019/0172155 A1 | 6/2019 | Byron et al. |
| 2019/0394507 A1 | 12/2019 | Hardee et al. |
| 2020/0005284 A1 | 1/2020 | Vijayan |
| 2020/0134585 A1 | 4/2020 | Xu et al. |
| 2020/0357051 A1 | 11/2020 | Hunt et al. |
| 2020/0357052 A1 | 11/2020 | Hunt et al. |
| 2020/0387923 A1 | 12/2020 | Mitchell |
| 2021/0060404 A1 | 3/2021 | Wanke et al. |
| 2021/0099762 A1 | 4/2021 | Bernstein et al. |
| 2021/0201339 A1 | 7/2021 | Ahlgren et al. |
| 2022/0327225 A1 | 10/2022 | Lyren |
| 2022/0337439 A1 | 10/2022 | Mccoy et al. |
| 2022/0337898 A1 | 10/2022 | Dorogusker et al. |
| 2022/0374503 A1 | 11/2022 | Goldston et al. |
| 2022/0417579 A1 | 12/2022 | Dorogusker et al. |
| 2023/0024373 A1 | 1/2023 | Dorogusker et al. |
| 2023/0037770 A1 | 2/2023 | Dorogusker et al. |
| 2023/0040545 A1 | 2/2023 | Dorogusker et al. |

OTHER PUBLICATIONS

Non-Final Office Action dated Apr. 4, 2018, for U.S. Appl. No. 15/855,802, of Jew, W., et al., filed Dec. 27, 2017.
Final Office Action dated Nov. 19, 2018, for U.S. Appl. No. 15/855,802, of Jew et al., filed Dec. 27, 2017.
Advisory Action dated Feb. 8, 2019, for U.S. Appl. No. 15/855,802, of Jew, W., et al., filed Dec. 27, 2017.
Non-Final Office Action dated Oct. 2, 2019, for U.S. Appl. No. 15/855,802, of Jew, W., et al., filed Dec. 27, 2017.
Non-Final Office Action dated Aug. 20, 2020, for U.S. Appl. No. 16/022,397, of Bekmann, J., et al., filed Jun. 28, 2018.
Final Office Action dated Mar. 6, 2020, for U.S. Appl. No. 15/855,802, of Jew, W., et al., filed Dec. 27, 2017.
Non-Final Office Action dated May 15, 2020, U.S. Appl. No. 15/995,039, of Perelli-Minetti, L., et al., filed May 31, 2018.
Advisory Action dated May 21, 2020, for U.S. Appl. No. 15/855,802, of Jew, W., et al., filed Dec. 27, 2017.
Non-Final Office Action dated Jun. 25, 2020, U.S. Appl. No. 15/994,882, of Kerof, V., et al., filed May 31, 2018.
Non-Final Office Action dated Oct. 7, 2020, for U.S. Appl. No. 15/855,802, of Jew, W., et al., filed Dec. 27, 2017.
Final Office Action dated Nov. 13, 2020, U.S. Appl. No. 15/995,039, of Perelli-Minetti, L., et al., filed May 31, 2018.
Final Office Action dated Jan. 6, 2021, U.S. Appl. No. 15/994,882, of Kerof, V., et al., filed May 31, 2018.
Advisory Action dated Feb. 18, 2021, for U.S. Appl. No. 15/995,039, of Perelli-Minetti, L., et al., filed May 31, 2018.
Final Office Action dated Mar. 26, 2021, for U.S. Appl. No. 16/022,397, of Bekmann, J., et al., filed Jun. 28, 2018.
Notice of Allowance dated on Apr. 15, 2021, U.S. Appl. No. 15/994,882, of Kerof, V., et al., filed May 31, 2018.
Final Office Action dated Apr. 19, 2021, for U.S. Appl. No. 15/855,802, of Jew, W., et al., filed Dec. 27, 2017.
Advisory Action dated May 25, 2021, for U.S. Appl. No. 16/022,397, of Bekmann, J., et al., filed Jun. 28, 2018.
Non-Final Office Action dated Aug. 12, 2021, U.S. Appl. No. 15/995,039, of Perelli-Minetti, L., et al., filed May 31, 2018.
Notice of Allowance dated Jul. 13, 2021, for U.S. Appl. No. 16/022,397, of Bekmann, J., et al., filed Jun. 28, 2018.
Advisory Action dated Sep. 15, 2021, for U.S. Appl. No. 15/855,802, of Jew, W., et al., filed Dec. 27, 2017.
Notice of Allowance dated Oct. 4, 2021, for U.S. Appl. No. 15/855,802, of Jew, W., et al., filed Dec. 27, 2017.
Notice of Allowance dated Sep. 9, 2021, for U.S. Appl. No. 16/022,397, of Bekmann, J., et al., iled Jun. 28, 2018.
Supplemental Notice of Allowability dated Oct. 15, 2021, for U.S. Appl. No. 16/022,397, of Bekmann, J., et al., filed Jun. 28, 2018.
Supplemental Notice of Allowability dated Oct. 15, 2021, for U.S. Appl. No. 15/855,802, of Jew, W., et al., filed Dec. 27, 2017.
Supplemental Notice of Allowability dated Oct. 25, 2021, for U.S. Appl. No. 15/855,802, of Jew, W., et al., filed Dec. 27, 2017.
Non-Final Office Action dated Jun. 23, 2022, U.S. Appl. No. 17/704,153, of Kerof V., et al., filed Mar. 25, 2022.
Notice of Allowance dated Feb. 23, 2022, U.S. Appl. No. 15/995,039, of Perelli-Minetti, L., et al., filed May 31, 2018.
International Search Report and Written Opinion for International Application No. PCT/US2022/025642, dated Jun. 30, 2022.

* cited by examiner

CAPITAL LOAN OPTIMIZATION

CROSS-REFERENCE TO RELATED APPLICATION

This application is a divisional of, and claims priority to, U.S. patent application Ser. No. 16/022,397, filed Jun. 28, 2018, issued as U.S. Pat. No. 11,176,607, and which is incorporated by reference herein.

BACKGROUND

Many merchants require loans from financial institutions in order to sustain and grow businesses. Traditionally, a merchant will apply for a loan when the merchant believes the loan will be helpful in growing the business. A financial institution may review a loan application and, with limited information, perform a risk analysis of the merchant. The financial institution then may either approve or deny the loan based on the risk analysis. However, because the merchant and the financial institution are operating with limited information in the marketplace, the timing and/or amount of the loan may not be optimal to best sustain or grow the business. Accordingly, many loans that are given to merchants do not have as good an outcome as a better chosen opportunity might.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
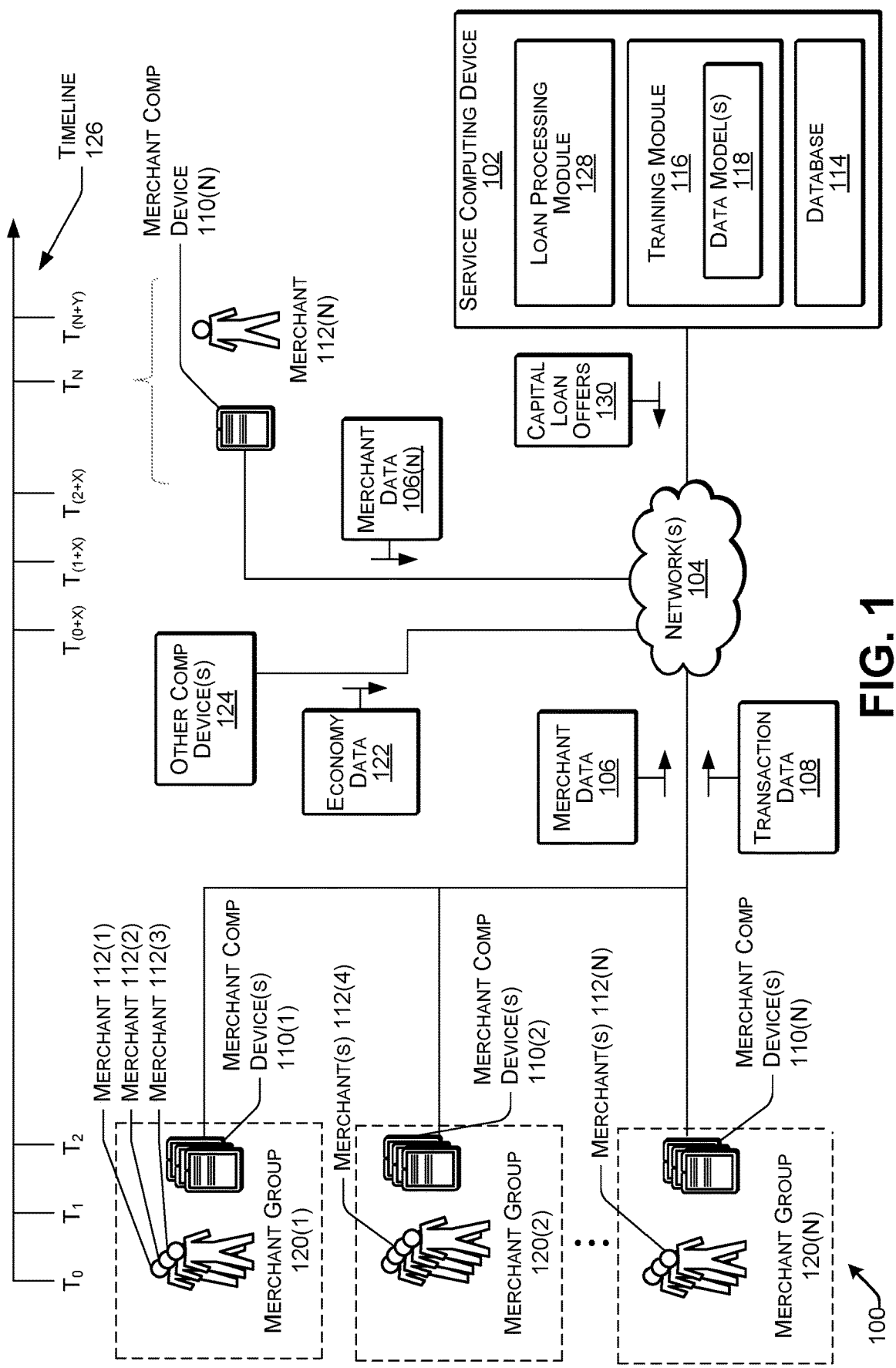
FIG. 1 illustrates an example environment of an optimized capital loan offering system configured to provide intelligent capital loan offers and train a data model to optimize capital loan offers for merchants.

Techniques described herein are directed to improving a timing associated with offers for capital loans, and optimizing the capital loan offer to provide a maximum benefit for merchants. For the purposes of this discussion, a merchant can be any entity that offers items (e.g., goods or services) for sale. In at least one example, a service provider can provide financing services, as well as various other services, to merchants. For instance, the service provider may provide payment processing services, payroll services, inventory management services, employee management services, scheduling services, dispute resolution services, etc. for merchants. Due to the unique perspective of the service provider, and the access to information from various services provided, the service provider may be configured to determine an optimal time, amount, and/or terms/conditions for a capital loan offer to a merchant, in order to maximize acceptance and potential benefit of the loan.

Traditionally, processes for offering capital loans to merchants involve a merchant first applying for a loan based on a subjective belief that the loan at the time of submitting a loan application will facilitate growth of the merchant's business. A financing service or financial institution may perform a risk analysis of the loan based on limited information provided in the loan application. As described above, the subjective belief of the merchant that timing is right for a loan may not be accurate, and taking a loan at an inopportune time may be suboptimal to the merchant's business. Furthermore, the limited information gleaned from the loan application may result in the financing service or financial institution taking unnecessary risks with respect to loans.

Techniques described herein are directed to leveraging information associated with previous loans offered to multiple merchants and machine learning mechanisms to intelligently optimize loans offered to merchants to maximize benefits resulting therefrom. For instance, in at least one example, techniques described herein can intelligently determine an optimal time, amount, terms/conditions, and/or other aspects of a capital loan offer to ensure growth of a merchant business after acceptance of the capital loan. Furthermore, techniques described herein can intelligently determine a channel for capital loan offer presentation to the merchant, to maximize the potential that the merchant will accept the offer.

In various examples, the service provider may access data associated with a plurality of merchants. The data may include merchant characteristics, which can be based on merchant data (e.g., type of merchant, size of merchant (e.g., a number of employees, square footage of brick and mortar store, etc.), appointments, inventory (e.g., types of goods and services, amounts of products sold, turnover rate, sales velocity, profit margins, etc.), processing patterns, point of sale devices used, location(s), customer data (e.g., frequent customers, rewards programs, customer demographics, etc.), employee data (e.g., roster, payroll data, demographics, commissions, etc.), or the like) and/or transaction data (e.g., sales data, products sold concurrently, payment methods, etc.). In some examples, the service provider may assign each of the merchants to a group based on one or more of the merchant characteristics. In some examples, the service provider may utilize techniques, such as clustering, to group the merchants into clusters based on one or more of the merchant characteristics.

In various examples, the service provider may assign merchants into groups merchants based on characteristics of the merchants. In such examples, the service provider may analyze the characteristics of the merchants to determine similarities within a group. In some examples, the service provider may utilize techniques, such as clustering analyses or other machine learning techniques, to identify related merchants (e.g., based on most relevant similarities). For example, the service provider may determine, at a first time, that inventory and processing patterns are characteristics that define a group. The service provider may then cluster merchants with similar inventory and similar processing patterns into a group.

In various examples, the service provider may periodically (e.g., hourly, daily, monthly, etc.) and/or randomly (e.g., once per month on an undefined day, when instructed by an operator, etc.) analyze the characteristics of merchants to update groups. In some examples, the service provider may analyze merchants of a particular group to determine whether they should remain in the group, or be assigned to a different group. For example, a merchant at a time $T_0$ may sell a particular type of goods and may have a particular processing pattern that warrants assignment to group A. However, at time $T_1$, the service provider may determine that the merchant adjusted a processing pattern. Based on the change in the processing pattern, the service provider may determine that the merchant should be assigned to group B.

In some examples, the service provider may analyze the characteristics and determine that different characteristics define at least one of the groups (e.g., grouping based on different categories). In such examples, the service provider may re-assign at least some of the merchants to different groups based on the different characteristics. Continuing the example from above, the service provider may determine, at a second time, that the updated relevant characteristics for grouping are sales velocity, inventory, and profit margin instead of inventory and processing patterns. Based on the determination of the updated relevant characteristics, the service provider may re-assign merchants to groups based on sales velocity, inventory, and profit margin of each merchant.

In various examples, the service provider may access loan data associated with capital loans offered to the merchants. The loan data may include a time associated with the loan offer, a time of acceptance or declination, an amount, terms/conditions associated with the loan (e.g., fees, interest rate, payment period, etc.), and/or other information associated with each loan. In various examples, the service provider may determine a growth of a business associated with each merchant within a period of time after the time associated with a respective loan offer (e.g., two months, six months, one year, two years, etc.), and whether each merchant accepted or denied the respective loan offers. The growth may be determined based on gross payment volume (GPV), profit/loss, a number of employees, a number of point of sale devices used, a number of merchant locations (e.g., increase or decrease in brick and mortar stores), and/or other factors related to the growth of a business. In at least one example, the growth may be correlated to loan data and/or merchant characteristics to determine an efficacy of the loan (e.g., success of the loan). For example, the service provider may identify a first merchant in a first group who accepted a loan offer at $T_1$, and a second merchant in the first group who accepted a loan offer at $T_2$. The service provider may access merchant characteristics of the first merchant and the second merchant at $T_1$ and $T_2$, respectively, and again six (6) months after respective acceptance to determine a respective growth of the first merchant and the second merchant. The service provider may identify a third merchant in the first group who did not accept the loan offer, and may access merchant characteristics at the time of loan offer and again six (6) months after declination, to determine a third growth associated with the third merchant. The service provider may then compare the respective growth of the first, second, and third merchants to determine the efficacy of the respective loan.

In various examples, the service provider may utilize machine learning techniques and/or statistical analysis to determine aspects of the loan data and/or the merchant characteristics that are predictive of a successful loan (e.g., predictive factors). Predictive factors may include merchant characteristics, loan data (e.g., loan characteristics, a time to offer the loan, a loan offer period (e.g., a period of time to allow acceptance), and/or economy data corresponding to successful loans (e.g., high growth rate, high acceptance rate, etc.). As a non-limiting example, the service provider may determine that, for a group (e.g., cluster) of coffee shop merchants with fewer than four employees, those who accepted loans for less than $10,000 in September, and invested in two additional employees and two additional point of sale (POS) devices for the fall and winter months experienced the greatest growth in business over the following year. Accordingly, the service provider may identify a loan amount for less than $10,000 and a time in September as predictive factors of a successful loan for similarly situated merchants (e.g., merchants with similar merchant characteristics).

Based on the determination of predictive factors of successful loans for each group of merchants, the service provider may generate loan offers for merchants in each group based on timing predicated by the predictive factors. The service provider may generate a new loan offer for a merchant who is new to one or more services provided by the service provider, new to the group (e.g., after group re-assignment), and/or upon a determination that the predictive factors apply to a merchant who has been associated with a group. Continuing the example from above, the service provider may identify a new merchant in the coffee shop group, and may determine that September is approaching. The service provider may generate a loan offer for the new merchant for an amount less than $10,000. Additionally, the service provider may include information regarding suggested uses of the money based on information gleaned from loans previously offered to similarly situated merchants (e.g., how merchants had invested the capital loans, and growth resulting therefrom). For example, the service provider may inform the new merchant that other similarly situated merchants have experienced growth from the capital loan by investing in an additional two employees and two POS devices.

In various examples, the service provider may utilize machine learning techniques and/or statistical analysis to determine a channel (e.g., traditional mail, email, text, merchant application notification, dashboard, telephone call, etc.) for providing an offer to a merchant that is most predictive of the merchant accepting the offer. For example, using the coffee shop merchant example from above, the service provider may determine that 95% of the offers that were sent via email were accepted as compared to 30% of the offers that were sent via a merchant application notification. The service provider may then determine that the email channel is the most predictive of the merchant accepting an offer, and may favor the email channel for loan offers sent to similarly situated merchants.

Techniques described herein offer various improvements to existing capital loan offering systems. As discussed above, traditional financial institutions are not able to determine a preferred time to offer a capital loan to a business. Thus, traditional financial institutions encounter the technical problem of utilizing computing power and bandwidth to generate unsuccessful loan offers due to a lack of information about the merchants and the market. However, due to the unique position of the service provider in the marketplace, that enables the service provider to access merchant data that other financial institutions do not have and/or cannot access (and definitely not in near real-time), the capital loan optimization described herein solves this technical problem by accessing data associated with multiple merchants and multiple loan offers to determine a preferred time to offer a loan to a particular merchant.

Furthermore, unlike traditional loan offerings, the optimized capital loan offering techniques described herein provide capital loan offers at times that are preferred for business growth. Because the offers are timed well, the merchants are more likely to take advantage of the loan offers. The optimized capital loan offering techniques described herein, therefore, require fewer network transmissions to complete a capital loan contract, thereby leading to increased bandwidth being available for other network traffic. Additionally, due to the optimization of timing and loan characteristics, the optimized capital loan offering techniques may reduce the number of offers sent, further decreasing the network transmissions with regard to capital loan contracts. Thus, the optimized capital loan offering techniques described herein further increase bandwidth being available for other network traffic.

FIG. 1 illustrates an example environment 100 of the optimized capital loan offering system configured to provide intelligent capital loan offers and train a data model to optimize capital loan offers for merchants. The optimized capital loan offering system may include a service computing device 102. In various examples, the service computing device 102 may be configured to communicate with other devices in a distributed computing resource (not illustrated). Service computing device 102 may include a variety of device types configured to communicate via one or more networks 104, and are not limited to a particular type of device. In some examples, device 102 may include stationary devices, including but not limited to servers, desktop computers, personal computers, work stations, and thin clients, such as those capable of operating in a distributed computing resource. In some examples, service computing device(s) 102 may include mobile devices, including but not limited to mobile phones, tablet computers, laptop computers, and any other mobile computers or mobile telecommunication devices. In various examples, service computing device(s) 102 may include any other sort of computing device configured to communicate via the one or more networks 104.

In various examples, network(s) 104 can include public networks such as the internet, private networks such as an institutional and/or personal network or some combination of public and private networks. Network(s) 104 can also include any type of wired and/or wireless network, including but not limited to local area networks (LAN), wide area networks (WAN), satellite networks, cable networks, Wi-Fi networks, WiMax networks, mobile communications networks (e.g., 3G, 4G, etc.), or any combination thereof. Network(s) 104 can utilize communications protocols, including packet-based and/or datagram-based protocols, such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateway access points, firewalls, base stations, repeaters, backbone devices, and the like.

In some examples, network(s) 104 may further include devices that can enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In various examples, the service computing device 102 may receive merchant data 106 and/or transaction data 108 from one or more merchant computing devices 110 associated with one or more merchants 112. The merchant data 106 may include a type of merchant, a size of merchant (e.g., a number of employees, a number of point of sale devices used by the merchant, square footage of brick and mortar store, etc.), merchant appointments, inventory (e.g., types of goods and services, amounts of products sold, turnover rate, sales velocity, profit margins, etc.), processing patterns, a type of point of sale device used by the merchant, a location associated with the merchant, customer data (e.g., frequent customers, rewards programs, customer demographics, etc.), and/or any other information used to describe the merchant and/or merchant business. The transaction data 108 may include sales data (e.g., frequency of sales, amount per sale, average sale value, most frequent product sold, etc.), products sold concurrently, payment methods, and any other data related to one or more transactions performed by the merchant. In various examples, the service computing device 102 may receive the merchant data 106 and/or the transaction data 108 from the merchant computing device(s) 110 responsive to the merchant(s) 112 establishing an account and/or signing up for a service offered by a service provider associated with the service computing device 102.

In some examples, the service computing device 102 may store the merchant data 106 and/or the transaction data 108 in a database 114. In some examples, a training module 116 of the service computing device 102 may access the merchant data 106 and/or the transaction data 108 in the database 114, and may process the data to train one or more data models 118 to determine one or more merchant groups 120. As will be discussed in further detail below with regard to FIG. 2, in such examples, the training module 116 may utilize machine learning techniques to train the data model(s) 118. Additionally, or in the alternative, the data model(s) 118 may utilize one or more statistical models for processing data and determining an outcome.

In some examples, the data model(s) 118 may analyze the merchant data 106 and/or the transaction data 108 to group the merchant(s) 112 into groups (e.g., clusters) of most closely related merchants (e.g., similarly situated merchants). In such examples, the grouping may be based on one or more merchant characteristics and/or economy data 122 received from one or more other computing devices 124. For the purposes of this discussion, the merchant characteristic(s) may include merchant data 106 and/or transaction data 108. The economy data 122 may include macro-economy data including industry trends and/or market trends (e.g., local trends, regional trends, worldwide trends, supply/demand, resource scarcity, etc.). In various examples, the data model(s) 118 may determine that economy data 122 may apply to some merchant groups, but not others. For example, the data model(s) 118 may determine that in a particular region, coffee shops and bakeries of a particular size are closely tied together in business. The data model(s) 118 may determine that merchants 112 who run coffee shops and bakeries of the particular size should be grouped together, such as in merchant group 120(1). For another example, the data model(s) 118 may determine that the relevant factors for grouping are inventory, profit margin, and transaction frequency (e.g., twelve (12) transactions per hour, thirty (30) transactions per day, etc.), and do not involve economy data 122. The data model(s) 118 may determine that merchants with similar inventory, profit margin, and transaction frequency should be grouped together, such as in merchant group 120(2).

In various examples, the data model(s) 118 may determine that the merchants should be grouped together based on a similarity score between merchants exceeding a threshold. In such example, the data model(s) 118 may calculate a score for each merchant compared to another merchant and/or a group of other merchants. In some examples, the grouping of similarly situated merchants may be determined based on merchants sharing a number of merchant characteristics (e.g., 5, 10, 15, etc.), merchants sharing a predetermined set of merchant characteristics (e.g., merchant type, inventory, size, etc.), merchants sharing a percentage of merchant characteristics, or the like. For example, the data model(s) 118 may determine that merchants who share five merchant characteristics are similarly situated. For another example, the data model(s) 118 may determine that merchants sharing 50% of the same or similar characteristics, may be similarly situated if the shared merchant characteristics include inventory, type, and banking information. For yet another example, the data model(s) 118 may determine, based at least in part on economy data 122, that merchants in a particular region sharing a same or similar merchant size, location, and client demographic may be similarly situated in the particular region, but merchants in a different region sharing the same or similar merchant size, location, and client demographic may not be similarly situated.

In various examples, the data model(s) 118 may periodically (e.g., hourly, daily, monthly, etc.) and/or randomly (e.g., once per month on an undefined day, when instructed by an operator, etc.) analyze the merchant characteristics to update groups (e.g., adjust merchants in individual groups). In some examples, the data model(s) 118 may analyze merchants of a particular group (e.g., merchant data associated with such merchants), such as merchant group 120(1) to determine whether they should remain in the merchant group 120(1), or be assigned to a different group, such as merchant group 120(N). For example, a merchant at a time $T_0$, illustrated on timeline 126, may sell a particular type of goods and may have a particular processing pattern that warrants assignment to merchant group 120(1). However, at time $T_1$, the data model(s) 118 may determine that the merchant adjusted a processing pattern. Based on the change in the processing pattern, the data model(s) 118 may determine that the merchant should be assigned to merchant group 120(N).

In various examples, the service computing device 102, via a loan processing module 128, may process loan data from one or more capital loan offers 130 provided to merchants 112 in each merchant group 120. The loan data may include a time associated with the loan offer, a time of acceptance or declination, loan characteristics (e.g., an amount, a loan period, terms/conditions associated with the loan (e.g., fees, interest rate, payment period, etc.), or the like), and/or other information associated with each loan. In some examples, the loan processing module 128 may utilize the data model(s) 118 trained by the training module 116 to determine a growth of a business associated with the merchant 112 to whom the capital loan offer 130 was presented.

In various examples, the loan processing module 128 may determine success data (e.g., level of success) of a capital loan corresponding to a capital loan offer 130. In some examples, the success data may be based on a growth of a business associated with each merchant within a period of time after the time associated with a respective capital loan offer (e.g., two months, six months, one year, two years, etc.), and whether each merchant 112 accepted or denied the respective loan offers. In some examples, the loan processing module 128 may utilize one or more data models 118 trained by the training module 116, to determine the growth of a business. Additionally, or in the alternative, the loan processing module 128 may utilize statistical analysis to determine the growth of a business. The growth may be determined based on gross payment volume (GPV), profit/loss, a number of employees, a number of point of sale devices used, a number of merchant locations (e.g., increase or decrease in brick and mortar stores), and/or other factors related to the growth of a business. For example, the loan processing module 128 may determine that a subgroup of merchants in a merchant group 120 accepted capital loan offers. The loan processing module 128 may analyze growth data, such as an increase in profits, of the first subgroup of merchants to determine the success of the respective loans offered to the subgroup of merchants. In various examples, the success may be based on a threshold increase in growth, such as, for example, a threshold increase in profit.

In at least one example, the growth may be correlated to loan data and/or merchant characteristics to determine the level of success of the loan. For example, the loan processing module 128 may identify a first merchant 112(1) in a first merchant group 120(1) who accepted a first capital loan offer 128(1) at $T_0$, and a second merchant 112(2) in the first merchant group 120(1) who accepted a second capital loan offer 130(2) at $T_1$ (e.g., the subgroup of merchants described above). The loan processing module 128 and/or data model(s) 118 may access merchant characteristics of the first merchant 112(1) and the second merchant 112(2) at $T_0$ and $T_1$, respectively, and again at times $T_{(0+X)}$ and $T_{(1+X)}$ after acceptance to determine a respective growth of the first merchant 112(1) and the second merchant 112(2). The time (x) may be any amount of time (e.g., six months, 8 months, one year, two years, etc.) determined by the service computing device 102, such as via the data model 118 and/or the loan processing module 128, in which a business growth may be calculated. In some examples, the time (x) may be determined based on the loan period. In such examples, the time (x) may be the loan period or some fraction thereof. For example, the loan is due in six months, and the value (x) is six months. For another example, the loan may be due in 24 months, and the time (x) is 12 months (e.g., one half of the loan period). That is, the time (x) can be configurable.

Additionally, the loan processing module 128 and/or data model 118 may identify a third merchant 112(3) in the first merchant group 120(1) who did not accept a capital loan offer 130 at time $T_2$, and may access merchant characteristics associated with the third merchant 112(3) at time $T_{(2+X)}$, to determine a third growth associated with the third merchant. The loan processing module 128 and/or data model(s) 118 may then compare the respective growth of the first, second, and third merchants to determine a success of each capital loan.

In some examples, the loan processing module 128 and/or data model(s) 118 may access merchant characteristics of the first merchant 112(1), the second merchant 112(2), and the third merchant 112(3) periodically or at random intervals throughout the loan period and/or from $T_0$ to time $T_{(0+x)}$ and time (x), for example, to determine trends in each business over the time period. In some examples, the trends may be stored, such as in datastore 114, and used to determine one or more statistics associated with each capital loan. The statistics may include an average growth of businesses after accepting a similar loan, an average growth of businesses after declining a similar loan, investments (e.g., ways to spend the money) that led to higher and/or faster growth, and/or other information which may assist the merchant 112 in making a decision to accept and/or invest the money. In various examples, the trends may be used to determine the success of each capital loan.

In some examples, the success of each capital loan may be based on a percentage of growth from, for example, time $T_0$ to time $T_{(0+x)}$. In some examples, a level or degree of success may be correlated to the percentage of growth. For example, a growth less than 0% may be a level 0 success, 0-10% may be a level 1 success, 11-20% may be a level 2 success, and so on. For another example, (−20%)-(−11%) growth may be a level −2 success, (−10%)-(0%) may be a level −1 success growth, 0-25% may be a level 1, 26-50% may be a level 2, and so on. Of course, other systems for leveling and/or determining degrees of success can be utilized.

Additionally, the loan processing module 128 and/or the data model(s) 118 may be configured to determine an acceptance rate of capital loan offers 130. The acceptance rate may be stored in a datastore corresponding to loan characteristics, merchant characteristics, economy data 122, or the like. In some examples, the acceptance rate data, such as a high acceptance rate, may be used to determine predictive factors and/or a successful loan. For example, the acceptance rate of capital loan offers delivered to merchants 112(4) in merchant group 120(2) is 50%, and the acceptance rate of capital loan offers 130 sent to merchants 112(5) in merchant group 120(N) is 80%. The data model(s) 118 may determine that the capital loan offers 130 sent to merchant group 120(N) have a higher acceptance rate. In some examples, the capital loan offers 130 sent to merchant group 120(N) may be preferred due to the high acceptance rate.

In various examples, data model(s) 118 may process the merchant characteristics, economy data 122, loan data, growth data and/or the success data associated with each capital loan offer 130, to determine one or more predictive factors associated with successful loans for similarly situated merchants. The predictive factors may include merchant characteristics, loan data (e.g., loan characteristics, a time to offer the loan, a loan offer period (e.g., a period of time to allow acceptance), and/or economy data corresponding to successful loans (e.g., high growth rate, high acceptance rate, etc.). For example, the data model(s) 118 may determine that, for a merchant group 120 comprising hair dressers and aestheticians with fewer than three employees, those who accepted loans for less than $8,000 in March, and invested in an additional employee and an additional point of sale (POS) device for the spring experienced the greatest growth in business over the following year. Accordingly, the data model(s) 118 may identify a loan amount for less than $8,000 and a March timeframe as predictive factors of a successful loan for similarly situated merchants. For another example, the data model(s) 118 may determine that, for a merchant group 120 comprising new businesses (e.g., open less than one year), capital loan offers 130 with lower fees were more likely to be accepted by the merchants 112, even if the percentage rate on the loan was higher than average. As such, the data model(s) 118 may determine low fees are a predictive factor for successful loans offered to a merchant with a new business.

In various examples, the data model(s) 118 may be configured to calculate a risk assessment associated with a particular loan offer. In such examples, the data model(s) 118 may calculate the risk assessment based on the merchant characteristics, the economy data 122, the loan data, the growth data and/or the success data associated with previously offered capital loans. In various examples, the data model(s) 118 may determine one or more loan characteristics based at least in part on the risk assessment. In at least one example, the data model(s) 118 may determine fees associated with the capital loan based on the risk assessment. For example, a capital loan determined to be low risk may have associated therewith a minimal fee (e.g., $0-50), whereas a capital loan determined to be a medium risk may have associated therewith a larger fee (e.g., $100-200).

In various examples, the data model(s) 118 may be configured to determine statistics associated with capital loans. In such examples, the data model(s) 118 may evaluate the merchant characteristics, loan data, economy data 122, and growth data to determine the statistics associated with the capital loans. The statistics may include an average growth of businesses after accepting a similar loan, an average growth of businesses after declining a similar loan, investments (e.g., ways to spend the money) that led to higher and/or faster growth, and/or other information which may assist the merchant 112 in making a decision to accept and/or invest the money. In some examples, the service computing device 102, such as via the loan processing module 128, may send relevant statistics to the merchants 112 concurrently with capital loan offers 130. In such examples, the relevant statistics may increase an acceptance rate of the capital loan offers 130. In some examples, the service computing device 102 may send relevant statistics to merchants 112 prior to sending the capital loan offer 130. For example, the data model(s) 118 may determine that an optimal time for offering a loan to a merchant 112 is in 14 days. If accepted within two days of the offer, the expected growth is 40% within a year. Three days prior to sending the offer, the loan processing module 128 may send the merchant 112 a message indicating that a loan would be beneficial to business, and has been shown to result in 40% growth within a year of acceptance of similarly situated merchants. In some examples, the service computing device 102 may send statistics to the merchant based on a determination that the capital loan offer 130 is not accepted within a threshold time (e.g., 12 hours, 24 hours, 2 days, etc.) of sending the offer.

Additionally, the data model(s) 118 may be configured to determine a channel (e.g., traditional mail, electronic mail, text, notification in merchant application, notification via a merchant device, message via an application, such as a social media application, dashboard, telephone call, etc.) for delivery of a capital loan offer 130 that has the highest likelihood of success (e.g., highest acceptance rate) for a given merchant. In some examples, the data model(s) 118 may process the merchant characteristics and/or loan data associated with each capital loan offer 130, and may determine an acceptance rate based on the respective channels of delivery. For example, the data model(s) 118 may determine that 90% of the capital loan offers 130 that were sent to retail merchants via email were accepted as compared to 40% of the capital loan offers 130 that were sent to retail merchants via a merchant application. The data model(s) 118 may then determine that the email channel is the most predictive of the retail merchant accepting an offer, and may favor the email channel for capital loan offers 130 sent to similarly situated merchants.

In various examples, the loan processing module 128 and/or the data model(s) 118 may store the predictive factors based on the associated merchant characteristics, loan data (e.g., loan characteristics (e.g., terms/conditions, loan period, fees, percentage rate for repayment, amount of money, etc.), a time associated with a loan offer, a time of acceptance and/or declination, etc.), success data corresponding to offered loans, and/or economy data 122, to determine an optimal time to generate one or more capital loan offers 130 for individual merchants 112. Additionally, the loan processing module 128 and/or the data model(s) 118 may determine one or more terms/conditions associated with the capital loan offer(s) 128 for merchants 112. For example, the loan processing module 128 may determine that, based on the size of a merchant business and how money is spent by the merchant (e.g., capital investments, running costs, etc.), a capital loan for $5000 should be offered to the merchant to increase inventory during a busy period of the year for similarly situated merchants. In some examples, the loan processing module 128 and/or the data model(s) 118 may store data corresponding to preferred channels for delivery of the capital loan offer(s) 128 to particular merchants 112.

As illustrated in FIG. 1, the service computing device 102 may receive merchant data 106(N) from a merchant computing device 110(N) associated with a merchant 112(N) at $T_N$. In some examples, the merchant 112(N) may be a new merchant 112 (e.g., new in commerce, new to service provider, etc.), and may send the merchant data 106(N) while registering for a service offered by the service provider associated with the service computing device 102. In other examples, the merchant 112(N) may be an existing merchant, and may send the merchant data 106(N) while signing up for, or utilizing, a service provided by the service provider associated with the service computing device 102. Or, in some examples, the merchant data 106(N) may be stored in association with the service computing device 102 (e.g., in a merchant profile), and can be accessible to the service computing device 102.

The service computing device 102 may receive the merchant data 106(N), and may assign the merchant 112(N) to a merchant group 120(N). In various examples, the merchant 112(N) may be assigned to a merchant group 120(N) based on a similarity score of the merchant 112(N) to other merchants 112 in a merchant group 120, such as merchants 112(5) in merchant group 120(N). In such examples, the service computing device 102, such as through the data model(s) 118, may calculate a similarity score for the merchant 112(N) compared to the merchant group 120(N) (e.g., merchants in the merchant group, a score of the merchant group as a whole, etc.). In various examples, the merchant 112(N) may be assigned to a particular merchant group 120(N) (not illustrated) based on the similarity score between the merchant 112(N) and the particular merchant group 120(N) being above a threshold similarity score. In some examples, the merchant 112(N) may be assigned to the merchant group 120(N) based on the similarity score between the merchant 112(N) and the particular merchant group 120(N) being the highest similarity score of the similarity scores calculated for merchant groups 120. In such examples, a close similarity between merchants 112 is measured by a high similarity score (e.g., above a threshold similarity score). In other examples, the merchant 112(N) may be assigned to the merchant group 120(N) based on the similarity score between the merchant 112(N) and the particular merchant group 120 being the lowest similarity score of the similarity scores calculated for merchant groups 120. In such examples, a close similarity between merchants 112 is measured by a low similarity score (e.g., below a threshold similarity score).

In various examples, the service computing device 102 may additionally receive transaction data 108 from the merchant 112(N). In such examples, the service computing device 102 may use the transaction data 108 to determine a merchant group 120 assignment. As discussed above, the merchant 112(N) is assigned to a merchant group 120(N) comprising merchants with similar relevant merchant characteristics.

In various examples, the service computing device 102 may evaluate the merchant characteristics of the merchant 112(N) to identify correlations between the merchant characteristics and predictive factors of a successful loan. The service computing device 102 may use the correlations to determine a preferred (e.g., optimal) time ($T_{(N+Y)}$) to provide a capital loan offer to the merchant 112(N), where Y is an amount of time after receipt of merchant data 106(N) (e.g., when the merchant onboards to a service and/or is assigned to a different merchant group).

Additionally, the service computing device may use the correlations to determine relevant terms/conditions for the capital loan. In some examples, the service computing device 102 may use the correlations to determine a channel in which to send the capital loan offer 130. For example, the service computing device 102 may determine that the merchant 112(N) sells ice cream, and a first predictive factor associated with successful loans offered to similarly situated ice cream merchants is providing a capital loan a month prior to the start of summer. The service computing device 102 may also determine that a second predictive factor associated with successful loans granted to similarly situated ice cream merchants is providing loans with fees less than $50 and interest rates less than 3.0%. The loan processing module 128 of the service computing device 102 may thus generate a capital loan offer 130 with a $10 fee and 2.0% interest rate. The loan processing module 128 may determine that a current time ($T_{(N+Y)}$) is 30 days (e.g., one month) prior to the first day of summer, and may send the capital loan offer 130 to the merchant 112(N) via the merchant computing device 110(N). In some examples, the loan processing module 128 may generate the capital loan offer 130, and store it, such as in datastore 114, until making a determination that the time is appropriate for delivery of the capital loan offer 130 (e.g., current time=$T_{(N+Y)}$). In some examples, the loan processing module 128 may first determine the time is appropriate for delivery, and may then generate and send the capital loan offer 130 to the merchant 112(N). Because the capital loan offer 130 is generated based on predictive factors of successful loans for similarly situated merchants 112, the capital loan offer 130 delivered to the merchant 112(N) has a high probability of acceptance and high likelihood of contributing to growth of the merchant business.

In various examples, the service computing device 102 may determine one or more statistics associated with the capital loan offer 130 to the merchant 112(N). In such examples, the data model(s) 118 may evaluate the capital loan offer 130 and other similar loan offers to similarly situated merchants to determine the statistic(s). In various examples, the statistics may assist the merchant 112(N) in making a decision to accept and/or invest the money. In various examples, the service computing device 102 may provide statistics before the capital loan offer 130 is delivered to the merchant computing device 110(N). In such examples, the statistics may serve to educate the merchant 112(N) about potential growth if the merchant business is infused with capital at a particular time. For examples, the loan processing module 128 may generate a message to send to the merchant computing device 110(N) three days before $T_{(N+Y)}$, indicating that similarly situated merchants have experienced upwards of a 50% growth in GPV after accepting a loan within two weeks from today.

In some examples, the service computing device 102 may provide statistics concurrently with the capital loan offer 130. In such examples, the loan processing module 128 may include the statistics in the message containing the capital loan offer 130. In various examples, the service computing device 102 may provide statistics after the capital loan offer 130 is delivered to the merchant computing device 110(N). The service computing device 102 may generate the message including relevant loan statistics to encourage the merchant 112(N) to accept the loan. In some examples, the loan processing module 128 may generate the message based on an indication that the merchant 112(N) has not accepted the offer within a threshold period (e.g., 12 hours, 1 day, etc.) of accepting the capital loan offer 130. For example, the loan processing module 128 may generate a message including an indication that other similarly situated merchants experienced an 20% increase in GPV over a six-month period after accepting a loan within 10 days of today, as compared merchants who did not accept the loan. However, other similarly situated merchants who waited 14 days from today to accept the loan only experienced an average of 10% growth over a similar time frame.

Figure 2:
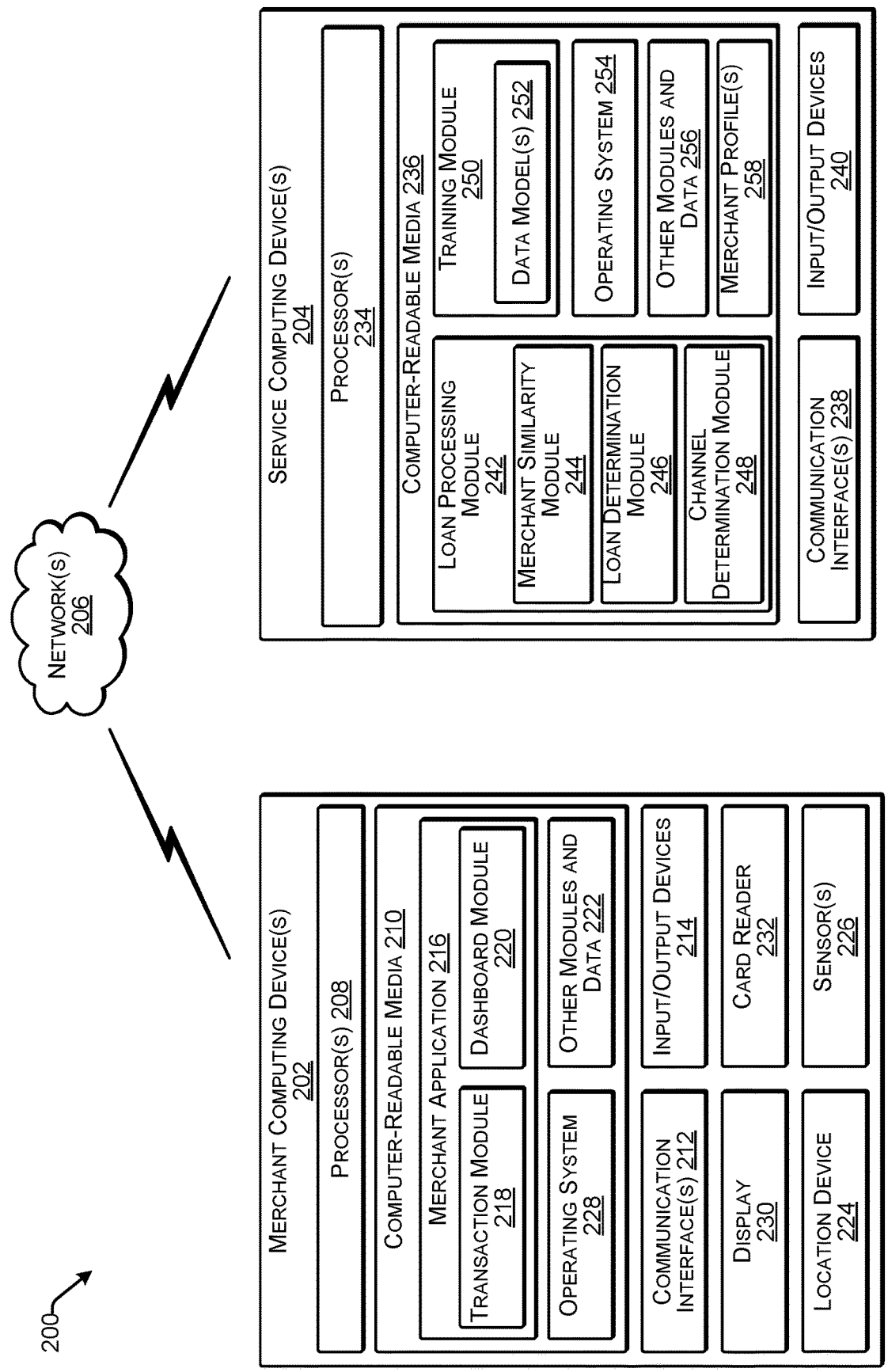
FIG. 2 illustrates an example environment for providing loan optimization processes to merchants.

FIG. 2 illustrates an example environment 200 for providing loan optimization processes to merchants. The environment 200 may include one or more merchant computing devices 202, such as merchant computing device(s) 110, which can communicate with one or more service computing devices 204, such as service computing device 102, via one or more networks 206, such as network(s) 104.

A merchant, such as merchant 112 illustrated in FIG. 1, may operate a merchant computing device of the merchant computing device(s) 202. In at least one example, the merchant computing device(s) 202 may be any suitable type of computing device, e.g., portable, semi-portable, semi-stationary, or stationary. Some examples of the merchant computing device(s) 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device(s) 202 includes one or more processors 208, one or more computer-readable media 210, one or more communication interfaces 212, and one or more input/output (I/O) devices 214. Each processor 210 can itself comprise one or more processors or processing cores. For example, the processor(s) 208 can be implemented as one or more microprocessors, microcomputers, microcontrollers, digital signal processors, central processing units, state machines, logic circuitries, and/or any devices that manipulate signals based on operational instructions. In some examples, the processor(s) 208 can be one or more hardware processors and/or logic circuits of any suitable type specifically programmed or configured to execute the algorithms and processes described herein. The processor(s) 208 can be configured to fetch and execute computer-readable processor-executable instructions stored in the computer-readable media 210.

Depending on the configuration of the merchant computing device(s) 202, the computer-readable media 210 may be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 210 may include, but is not limited to, RAM, ROM, EEPROM, flash memory, solid-state storage, magnetic disk storage, optical storage, and/or other computer-readable media technology. Further, in some examples, the merchant computing device(s) 202 may access external storage, such as RAID storage systems, storage arrays, network attached storage, storage area networks, cloud storage, or any other medium that can be used to store information and that can be accessed by the processor(s) 208 directly or through another computing device or network. Accordingly, the computer-readable media 210 may be computer storage media able to store instructions, modules or components that may be executed by the processor(s) 208. Further, when mentioned, non-transitory computer-readable media exclude media such as energy, carrier signals, electromagnetic waves, and signals per se.

The computer-readable media 210 may be used to store and maintain any number of functional components that are executable by the processor(s) 208. In some implementations, these functional components comprise instructions or programs that are executable by the processor(s) 208 and that, when executed, implement operational logic for performing the actions and services attributed above to the merchant computing device(s) 202. Functional components stored in the computer-readable media 210 can include a UI to manage a merchant application 216 executed on the merchant computing device(s) 202, which can include a transaction module 218 and a dashboard module 220. In various examples, the merchant application 216 may provide point-of-sale (POS) functionality to the merchant computing device(s) 202 to enable the merchant to accept payments from one or more customers at a POS location. For example, the merchant can use the merchant computing device(s) 202 to conduct transactions and accept payments through various different types of payment instruments, e.g., payment cards, electronic payment, cash, or the like, at the POS location from the one or more customers. In at least one example, the transaction module 218 can present various user interfaces to enable a merchant to conduct transactions, receive payments, and so forth. Further, the dashboard module 220 may enable the merchant to manage transactions, payments, a merchant account (e.g., merchant preferences, employee information, etc.), and so forth.

As described above, the service computing device(s) 204 may receive merchant data and/or transaction data from the merchant via the merchant computing device(s) 202. In some examples, the merchant data may be input via the merchant application 216 via the UI. In some examples, the merchant data may be determined based on merchant actions via the merchant application 216. For example, merchant data may be input via the dashboard module 220, such as during an initial set up of an instance of the merchant application or while managing a merchant account via the dashboard module 220. For another example, the transaction data may be transmitted via the transaction module 218 of the merchant application 216, such as during and/or after conducting a transaction for the sale of goods and/or services.

In various examples, the merchant data and/or transaction data may be received from one or more other components of the merchant computing device(s), such as other modules and data 222, a location device 224 (e.g., GPS device, or the like), a sensor 226 (such as an accelerometer, gyroscope, compass, proximity sensor, camera, microphone, biometric sensor, a switch, etc.), or the like. For example, a location associated with the merchant (e.g., merchant location) may be determined based on a signal transmitted by the location device 224. For another example, the merchant location may be determined based on the merchant inputting an address representing a brick and mortar store via the merchant application 216.

Additionally, the computer-readable media 210 may include additional functional components, such as an operating system 228 for controlling and managing various functions of the merchant computing device(s) 202 and for enabling basic user interactions. In addition, the computer-readable media 210 may also store data, data structures and the like, that are used by the functional components. Depending on the type of the merchant computing device(s) 202, the computer-readable media 210 may also optionally include other functional components and data, such as the other modules and data 222, which may include programs, drivers, etc., and the data used or generated by the functional components. For instance, in some examples, the merchant computing device(s) 202 may include a payroll module, an inventory management module, an employee management module, a financing module, an appointment module, etc., which may facilitate payroll services, inventory management services, employee management services, financing services, appointment services, etc., respectively. In some examples, the merchant data and/or transaction data may be received from the payroll module, the inventory management module, the employee management module, the financing module, the appointment module, etc. Further, the merchant computing device(s) 202 can include many other logical, programmatic and physical components, of which those described are merely examples that are related to the discussion herein.

The communication interface(s) 212 may include one or more interfaces and hardware components for enabling communication with various other devices, such as over the network(s) 206 or directly. For example, communication interface(s) 212 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 202 can further include the one or more I/O devices 214. The I/O devices 216 can include speakers, a microphone, a camera, and various user controls (e.g., buttons, a joystick, a keyboard, a keypad, etc.), a haptic output device, and so forth.

In at least one example, merchant computing device(s) 202 can include a display 230. Depending on the type of computing device(s) used as the merchant computing device(s) 202, the display 230 can employ any suitable display technology. For example, the display 230 can be a liquid crystal display, a plasma display, a light emitting diode display, an OLED (organic light-emitting diode) display, an electronic paper display, or any other suitable type of display able to present digital content thereon. In some examples, the display 230 may include a touch sensor to provide a touchscreen display configured to receive touch inputs for enabling interaction with a graphical user interface presented on the display 230. Accordingly, implementations herein are not limited to any particular display technology. Alternatively, in some examples, the merchant computing device(s) 202 may not include the display 230, and information can be presented by other means, such as aurally.

In addition, the merchant computing device(s) 202 may include or may be connectable to an instrument reader 232. In some examples, the instrument reader 232 can plug in to a port in the merchant computing device(s) 202, such as a microphone/headphone port, a data port, or other suitable port. The instrument reader 232 can include a read head for reading a magnetic strip and/or or an integrated chip of a payment card, and further can include encryption technology for encrypting the information read from the magnetic strip and/or the integrated chip. Alternatively, numerous other types of card readers can be employed with the merchant computing device(s) 202 herein, depending on the type and configuration of the merchant computing device(s) 202. For example, the instrument reader 232 may be configured to work in conjunction with the sensor(s) 226, such as a proximity sensor, camera, or other biometric sensor used for transaction authentication. For another example, the instrument reader 232 may be configured to detect electronic signals associated with payment devices, such as near-field communication devices, Bluetooth devices, proximity devices, and/or other proximity-related payment methods. Additionally, the merchant computing device(s) 202 can include various other components that are not shown, examples of which include removable storage, a power source, such as a battery and power control unit, a barcode scanner, a printer, a cash drawer, and so forth.

As described above, techniques described herein are directed to leveraging information associated with previous loans offered to multiple merchants and machine learning mechanisms to intelligently optimize loans offered to merchants and maximize benefits resulting therefrom. In at least one example, a service provider can operate the service computing device(s) 204. The service computing device(s) 204 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the service computing device(s) 204 as being present in a single location, these components and data may alternatively be distributed across different computing devices and different locations in any manner. Consequently, the functions may be implemented by one or more service computing devices 204, with the various functionality described above distributed in various ways across the different computing devices. Multiple service computing device(s) 204 may be located together or separately, and organized, for example, as virtual servers, server banks and/or server farms. The described functionality may be provided by the servers of a single entity or enterprise, or may be provided by the servers and/or services of multiple different customers or enterprises.

In the illustrated example, the service computing device(s) 204 may include one or more processors 234, one or more computer-readable media 236, one or more communication interfaces 238, and one or more input/output devices 240. Each processor 234 may be a single processing unit or a number of processing units, and may include single or multiple computing units or multiple processing cores. The processor(s) 234 may be implemented as one or more microprocessors, microcomputers, microcontrollers, digital signal processors, central processing units, state machines, logic circuitries, and/or any devices that manipulate signals based on operational instructions. For example, the processor(s) 234 may be one or more hardware processors and/or logic circuits of any suitable type specifically programmed or configured to execute the algorithms and processes described herein. The processor(s) 234 may be configured to fetch and execute computer-readable instructions stored in the computer-readable media 236, which can program the processor(s) 234 to perform the functions described herein.

The computer-readable media 236 may include volatile and nonvolatile memory and/or removable and non-removable media implemented in any type of technology for storage of information, such as computer-readable instructions, data structures, program modules, or other data. Such computer-readable media 236 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that may be accessed by a computing device. Depending on the configuration of the service computing device(s) 204, the computer-readable media 236 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 236 may be used to store any number of functional components that are executable by the processors 234. In many implementations, these functional components comprise instructions or programs that are executable by the processors 234 and that, when executed, specifically configure the one or more processors 234 to perform the actions attributed above to the service provider. Functional components stored in the computer-readable media 236 may include a loan processing module 242, which can include a merchant similarity module 244, a loan determination module 246, and a channel determination module 248, and a training module 250.

The loan processing module 242 may be configured to generate optimized capital loan offers for merchants, and provide the capital loan offers to the merchants. In some examples, the loan processing module 242 may include a merchant similarity module 244. In such examples, the merchant similarity module 244 may be configured to analyze merchant data and/or transaction data to identify merchant characteristics, and group one or more merchants in a merchant group based on the merchant characteristics. In some examples, the merchant similarity module 244 may be configured to analyze economy data, such as industry and/or regional trends in a market corresponding to businesses associated with merchants, and may group one or more merchants in a merchant group (e.g., assign the merchant to a merchant group) based in part on the economy data.

In various examples, the merchant similarity module 244 may be configured to group the merchant into a merchant group based on one or more same or similar merchant characteristics shared by the merchants in a group. In some examples, the merchant similarity module 244 may group merchants based on the merchants sharing a number of merchant characteristics, a percentage of merchant characteristics, specific merchant characteristics, and/or economy data related to the merchants. For example, a merchant may be assigned to a first merchant group based on a determination that the first merchant is of a merchant type, size, and location similar to the merchants in the first merchant group. For another example, a second merchant may be assigned to a second merchant group based on a determination that the first merchant has substantially similar inventory and processing patterns as the merchants in a second merchant group.

In some examples, the merchant similarity module 244 may calculate a similarity score of a merchant to other merchants in the group and/or the merchant group as a whole. In some examples, the merchant similarity module 244 may analyze merchant characteristics and/or economy data to determine a relevance factors for grouping (e.g., relevant merchant characteristics and/or relevant economy data factors), and may generate the similarity score based on the relevance factor. In various examples, the relevance factors may be determined by a data model 252, trained by the training module 250. In such examples, the data model 252 may determine the relevant merchant characteristics and/or relevant economy data factors that define similarity between merchants.

Continuing the example from above, the relevant merchant characteristics and/or relevant economy data for merchant grouping are merchant type, size, and location. Accordingly, the merchant similarity module 244 may assign a score based on the merchant type, size, and location. For example, the merchant type may be assigned a 1 if the merchant type matches the other merchants in a merchant group, and a 0 if the merchant type does not match. The merchant size may be assigned a 0.5 if the size is +/−1 employee as compared to the other merchants in the merchant group, and 0.5 factor if the square footage of a merchant shop is within 5% compared to the square footage of the merchant shops of other merchants in the merchant group. The merchant location may be assigned a 1.0 if it is within 1.0 miles, 0.8 if it is within 5.0 miles, 0.5 if it is within 10.0 miles, and 0.0 if it is greater than 10.0 miles from a central location of the other merchant locations in the merchant group.

In various examples, the merchant similarity module 244 may determine a merchant group assignment based on a highest similarity score between the merchant and the merchant group (e.g., most closely related). In some examples, the merchant similarity module 244 may determine a merchant group assignment based on a lowest similarity score between the merchant and the merchant group (e.g., least difference between the merchants). In such examples, the merchant similarity module 244 may calculate a score based on a difference between the merchant score and scores corresponding to other merchants and/or the merchant group. In various examples, the merchant similarity module 244 may determine that the similarity score associated with the merchant is within a threshold similarity score for a particular merchant group. In such examples, the merchant similarity module 244 may assign the merchant to the particular merchant group based on the determination.

In some examples, the merchant similarity module 244 may access one or more data models 252 to determine the relevant merchant characteristics and/or relevant economy data factors. As will be discussed in greater detail below, the merchant similarity module 244 may be trained by the training module 250 using training data, to determine the relevant merchant characteristics and/or relevant economy data factors.

In some examples, the merchant similarity module 244 may assign a merchant to a group based on a determination that the merchant has not previously been assigned to a group. In some examples, the merchant may not have been assigned to a group because the merchant is new to the service provider and/or a service provided by the service provider. In various examples, the merchant similarity module 244 may be configured to analyze merchant characteristics and/or economy data associated with merchants in each merchant group periodically and/or at random interval to determine if one or more merchants should be reassigned to a different merchant group. In some examples, the merchant similarity module 244 may reassign merchants to different groups based on a change to the merchant characteristics and/or economy data that is relevant to the merchant group assignment. For example, the merchant similarity module 244 may determine that a merchant, previously assigned to a merchant group based at least in part on having a single merchant location, has opened a second merchant location. Based on the determination of the second merchant location, the merchant similarity module 244 may re-assign the merchant to a different merchant group comprising merchants with two or more locations.

In some examples, the merchant similarity module 244 may reassign merchants to merchant groups based on a change to one or more relevant merchant characteristics and/or relevant economy data. For example, the merchant similarity module 244 may determine that the relevant merchant characteristics of merchant type, size, and location for a particular group has changed to merchant type, size, and profit margin. Based on the determination of a change to the relevant merchant characteristics, the merchant similarity module 244 analyzes the merchant characteristics associated with each merchant, and re-assigns merchants to merchant groups based on the merchant type, size and profit margin. In some examples, the merchant similarity module 244 may determine one or more relevant merchant characteristics and/or relevant economy data has changed based on information received from the data model(s) 252.

In some examples, the loan processing module 242 may include a loan determination module 246 configured to generate capital loan offers for merchants in a merchant group. The loan determination module 246 may generate the capital loan offers based on merchant data and/or transaction data (e.g., merchant characteristics) associated with a merchant, and/or economy data, such as industry and/or regional trends in a market corresponding to a business associated with the merchant. The loan determination module 246 may be configured to determine an optimal time for providing each capital loan offer to a respective merchant, to maximize the benefit of the loan associated therewith. The optimal time may include a day of the week, a time of day, a season, a month, and/or any other element of time associated with a capital loan offer determined to optimize the acceptance rate and/or benefit of the loan associated therewith. In various examples, the optimal time for providing each capital loan offer may be based on data corresponding to capital loans previously offered to one or more similarly situated merchants. In various examples, the loan determination module 246 may receive one or more predictive factors of a successful loan, such as from the data model(s) 252. In some examples, the optimal time for providing each capital loan offer may be based on the predictive factors. As will be discussed in greater detail below with respect to the data model(s) 252, the predictive factor(s) may be determined utilizing machine learning and/or statistical analysis, and may be based on loan data (e.g., a loan amount, terms/conditions, a time associated with the offer, acceptance, declination, etc.) and corresponding success data associated with loans previously offered to one or more merchants in the merchant groups. The success data may include acceptance data and/or growth data.

In various examples, the loan determination module 246 may be configured to provide a capital loan offer to a merchant via one or more channels. The one or more channels may include traditional mail, email, text, notification via an application (e.g., merchant application, dashboard), telephone call, or other means by which the capital loan offer may be provided. In some examples, the loan determination module 246 may communicate with the channel determination module 248, to determine a channel via which the loan determination module 246 provides the capital loan offer. In some examples, the channel determination module 248 may be configured to determine the channel(s) based on an acceptance rate of previous capital loan offers sent to similarly situated merchants. In various examples, the channel determination module 248 may access data stored by the training module 250 to determine a channel in which to provide the capital loan offer. In such examples, the training module 250 may utilize machine learning and/or statistical analysis to determine the channel in which to provide the capital loan offer, to maximize a probability of acceptance.

In some examples, the merchant application 216 may enable notifications to be received from a remote computing device, such as the service computing device(s) 204. In some examples, the service computing device(s) may be configured to cause the merchant computing device(s) 202 to surface a capital loan offer and/or message including statistics and benefits of the timely acceptance thereof. In such examples, the service computing device(s) may send an instruction to surface the capital loan offer and/or the message, such as via a push notification.

Additionally, the loan processing module 242 may be configured to determine statistics associated with capital loans. In such examples, the loan processing module 242 may evaluate the merchant characteristics, loan data, economy data, and/or growth data to determine the statistics associated with the capital loans. The statistics may include an average growth of businesses after accepting a similar loan, an average growth of businesses after declining a similar loan, investments (e.g., ways to spend the money) that led to higher and/or faster growth, and/or other information which may assist the merchant in deciding whether to accept the capital loan and/or determining how to invest the money (e.g., additional inventory, additional employees, etc.). In various examples, the loan processing module 242 may access statistical data determined by the data model(s) 252. In some examples, the loan processing module 242 may send relevant statistics to the merchants concurrently with capital loan offers, such as via the one or more channels. In such examples, the relevant statistics may increase an acceptance rate of the capital loan offers. In some examples, the loan processing module 242 may provide the relevant statistics to the merchants prior to sending the capital loan offer. For example, the loan processing module 242 may determine that an optimal time for offering a loan to a merchant is in 10 days. If accepted within two days of the offer, the expected growth is 40% within a year. Three days prior to sending the offer, the loan processing module 242 may send the merchant a message indicating that a loan would be beneficial to business, and has been shown to result in 40% growth within a year of acceptance of similarly situated merchants. In some examples, loan processing module 242 may send the statistics to the merchant based on a determination that a previously delivered capital loan offer was not accepted within a threshold time (e.g., 12 hours, 24 hours, 2 days, etc.) of sending the offer.

In at least one example, the service computing device(s) 204 may include an instance of a training module 250. The training module 250 may be configured to train data model(s) 252 using machine learning mechanisms. In at least one example, the training module 250 may access training data. The training data can include descriptive data indicative of information about a plurality of merchants and a plurality of capital loan offers, and economy data. The descriptive data may correspond to merchant data, transaction data, and loan data, as described above. The economy data may correspond to macro-economy industry trends and/or market trends (e.g., local trends, regional trends, worldwide trends, supply/demand, resource scarcity, etc.) corresponding to the plurality of merchants. Accordingly, the training data may include merchant data associated with a merchant and/or a merchant group, loan data corresponding to a capital loan offered to the merchant, a channel via which the capital loan was offered, additional information provided to the merchant regarding the loan, an acceptance or declination of the offer, growth data, and any other information to describe the capital loan offer.

The training module 250 may train data model(s) 252 based on a plurality of training data items such that, given a new input of merchant data and/or transaction data associated with a merchant, the data model(s) 252 may identify a merchant group with which to associate the merchant. The training module 250 may train the data model(s) 252 to determine loan characteristics of a capital loan offer and/or a time in which to provide the merchant with a capital loan. In some examples, the loan characteristics and/or the time in which to provide the merchant with the capital loan may be based on the merchant group to which the merchant is assigned. Additionally, the training module 250 may train the data model(s) 252 to determine a channel in which to provide the capital loan offer to the merchant. In various examples, the training module 250 may train the data model(s) 252 to determine additional information, such as one or more statistics related to previously offered capital loans, to provide to the merchant.

In at least one example, the training module 250 may utilize a machine learning mechanism to train the data model(s) 252. In such an example, the data model(s) 252 may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In at least one example, the training module 250 may receive updated training data and may iteratively update the data model(s) 252 based at least in part on the updated training data. Additional details associated with training the data model(s) 252 are described below with respect to FIG. 3.

Additional functional components stored in the computer-readable media 236 may include an operating system 254 for controlling and managing various functions of the service computing device(s) 204.

In at least one example, the computer-readable media 236 may include or maintain other functional components and data, such as other modules and data 256, which may include programs, drivers, etc., and the data used or generated by the functional components. Further, the service computing device(s) 204 may include many other logical, programmatic and physical components, of which those described above are merely examples that are related to the discussion herein.

In addition, the computer-readable media 236 may store data used for performing the operations described herein. Thus, the computer-readable media can store merchant profile(s) 258. In at least one example, the merchant profile(s) 258 can store merchant data and/or transaction data associated with individual merchant(s). As described above, merchant data may include, but is not limited to, a type of merchant, a size of merchant (e.g., a number of employees, a number of point of sale devices used by the merchant, square footage of coffee shop, etc.), merchant appointments, inventory (e.g., types of goods and services, amounts of products sold, turnover rate, sales velocity, profit margins, etc.), a type of point of sale device used by the merchant, a location associated with the merchant, customer data (e.g., frequent customers, rewards programs, customer demographics, etc.), employee data (e.g., roster, payroll data, demographics, commissions, etc.), and/or any other information used to describe the merchant and/or merchant business. The transaction data may include, but is not limited to, sales data (e.g., frequency of sales, amount per sale, average sale value, most frequent product sold, etc.), products sold concurrently, payment methods, and any other data related to one or more transactions performed by the merchant. Furthermore, in some examples, a merchant profile may include loan data and growth data associated with one or more capital loans previously offered to the merchant.

The communication interface(s) 238 may include one or more interfaces and hardware components for enabling communication with various other devices, such as over the network(s) 206. For example, communication interface(s) 238 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device(s) 204 may further be equipped with various input/output (I/O) devices 240. Such I/O devices 240 may include a display, various user interface controls (e.g., buttons, joystick, keyboard, mouse, touch screen, etc.), audio speakers, connection ports and so forth.

FIGS. 3-6 are flow diagrams illustrating example processes according to some implementations. The processes of FIGS. 3-6 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3-6 can be combined with some or all of the operations illustrated in others of FIGS. 3-6. For discussion purposes, the processes are described with reference to the environments, architectures and devices described in the examples herein, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 3:
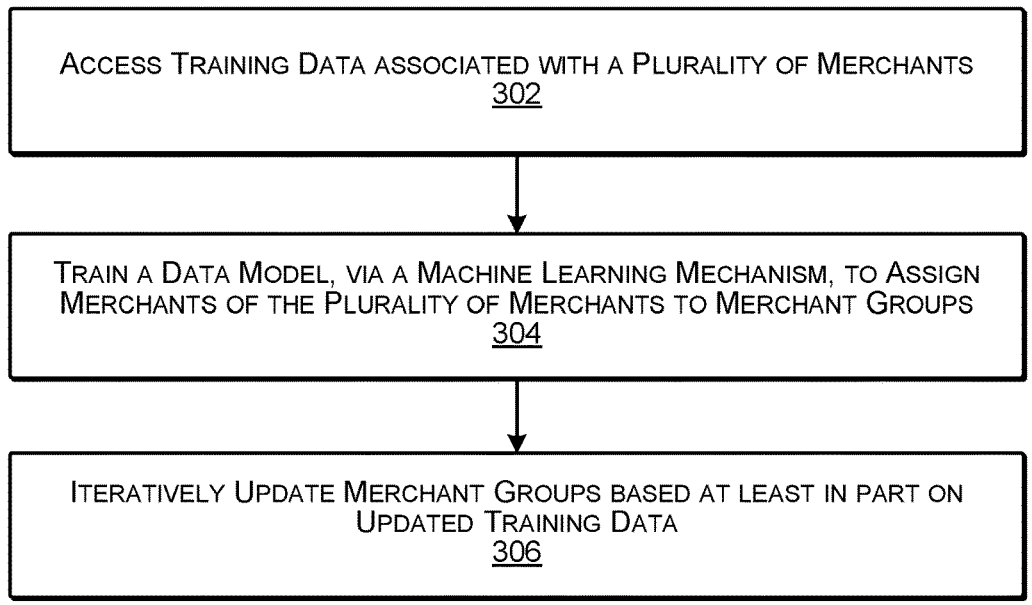
FIG. 3 is a flow diagram illustrating an example process for training a data model to assign merchants into merchant groups.

FIG. 3 illustrates an example process 300 for training a data model to assign merchants into merchant groups. FIG. 3 is described in the context of the environments and device(s) described above with reference to FIGS. 1 and 2, but is not limited to such environments and device(s).

Block 302 illustrates accessing training data associated with a plurality of merchants. As described above, the training module may train one or more data models leveraging machine learning mechanisms. In at least one example, the training module may access the training data. The training data may include merchant data and/or transaction data associated with the plurality of merchants, as described above. The merchant data and/or transaction data may be used to determine one or more merchant characteristics.

Block 304 illustrates training a data model via a machine learning mechanism, to assign merchants of the plurality of merchants to merchant groups. The training module may train a data model based on a plurality of training data items such that, given a new input of merchant data and/or training data associated with a merchant, the data model may output a merchant group in which to assign the merchant. In at least one example, the training module may utilize a machine learning mechanism to train the data model. In such an example, the data model can be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. In various examples, the assignment of merchants into merchant groups may be based on statistical analyses of merchant characteristics. For instance, the training module may utilize techniques, such as k-means clustering, etc. to determine merchant groups.

Block 306 illustrates updating group assignments. In at least one example, the training module may receive updated training data. For instance, training module may receive updated training data after a lapse of a predetermined period of time, at a particular frequency, etc. The updated training data can include updated merchant data and/or transaction data. Furthermore, the updated training data may indicate whether a previously assigned merchant group output by the data model was accurate. In at least one example, training module may receive updated training data and may re-train the data model based at least partly on the updated training data.

Figure 4:
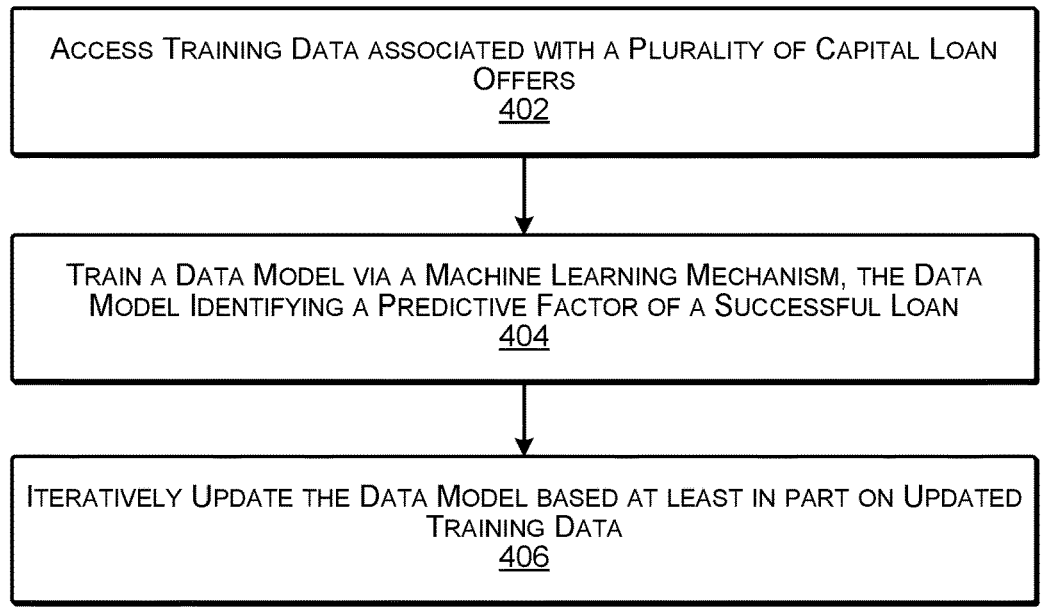
FIG. 4 is a flow diagram illustrating an example process for training a data model to optimize capital loan offers for merchants.

FIG. 4 illustrates an example process 400 for training a data model to optimize capital loan offers for merchants. FIG. 4 is described in the context of the device(s) described above with reference to FIGS. 1 and 2, but is not limited to such device(s).

Block 402 illustrates accessing training data associated with a plurality of capital loan offers. As described above, the training module may train one or more data models leveraging machine learning mechanisms. In at least one example, the training module may access training data. The training data may include loan data associated to a plurality of capital loan offers provided to merchants, as described above. Additionally, the training data may include merchant data and/or transaction data associated with the merchants. Furthermore, the training data may include growth data representative of growth of a merchant business a time after the capital loan offer is provided to the merchants. In some examples, the capital loan offers may be generated based on statistical analyses of merchant data, transaction data, loan data and/or growth data. For instance, the training module can utilize techniques, such as k-means clustering, etc., to identify what characteristics are representative of successful capital loans (e.g., large growth, high growth rate, high acceptance rate, etc.). With that information, the training module can identify predictive factors associated with successful loans.

Block 404 illustrates training a data model via a machine learning mechanism, the data model identifying a predictive factor of a successful loan. The training module may train the data model based on a plurality of training data items such that, given a new input of merchant data and/or transaction data, associated with a merchant, the data model may output a predictive factor of a successful loan. The predictive factor may include a time to offer a capital loan, a time period for acceptance of the capital loan, terms/conditions of the capital loan, or the like. In at least one example, the training module may utilize a machine learning mechanism to train the data model. In such an example, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In some examples, the data model may be trained on training data associated with merchant groups, such as those described above with regard to FIG. 3. In such examples, the data model may be representative of the merchant group. Such a data model may be more accurate for identifying predictive factors for a successful loan for particular merchants.

Block 406 illustrates iteratively updating the data model based at least in part on updated training data. In at least one example, the training module may receive updated training data. For instance, training module may receive updated training data after a lapse of a predetermined period of time, at a particular frequency, etc. The updated training data may include updated merchant information and updated information indicating how merchants are using services offered by the service provider. Furthermore, the updated training data may indicate whether the predictive factors for the successful loan previously output by the data model were accurate (e.g., the merchant accepted the loan and thereafter experienced business growth). In at least one example, training module may receive updated training data and can re-train the data model based at least partly on the updated training data.

Figure 5:
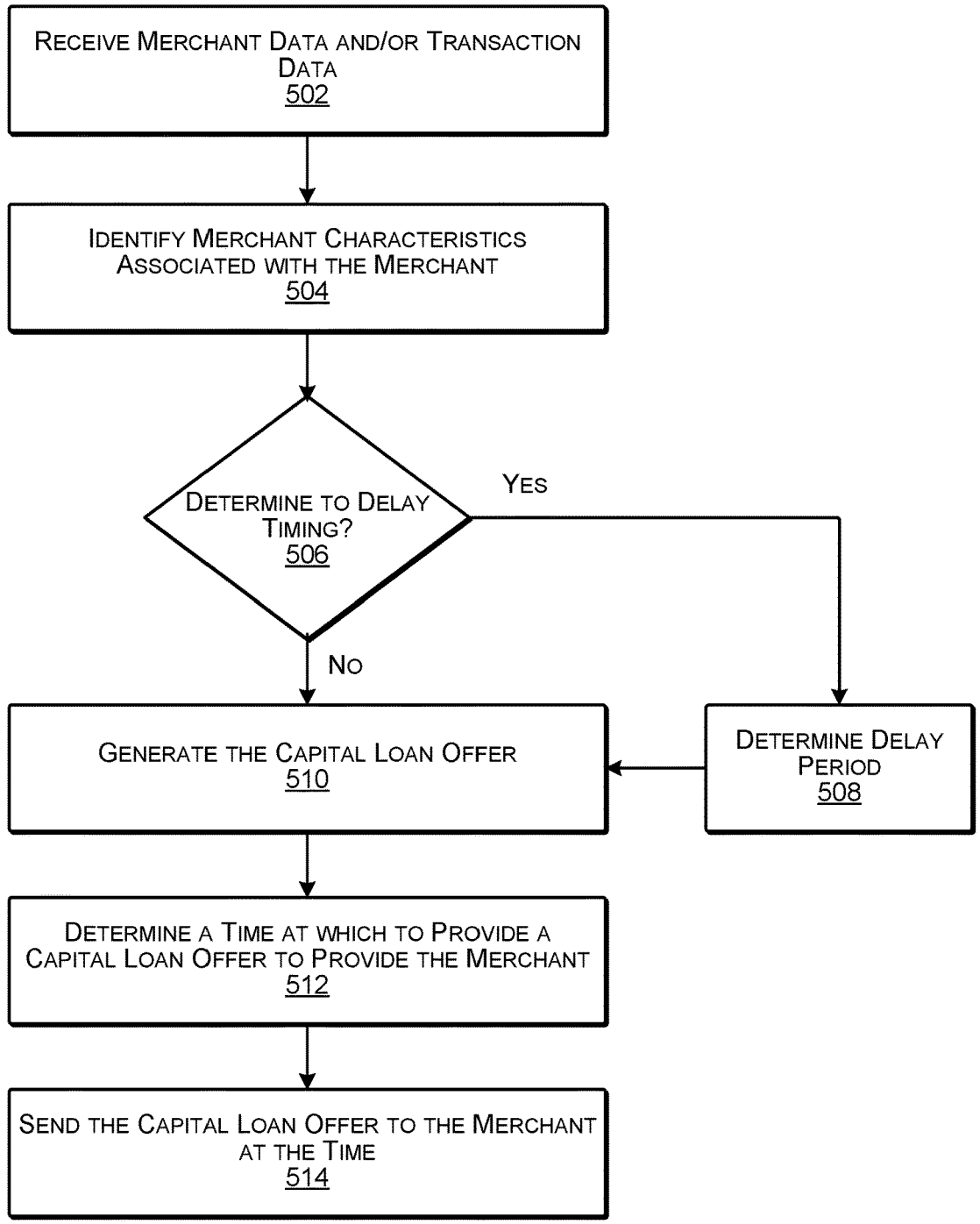
FIG. 5 is a flow diagram illustrating an example process for generating a capital loan offer and providing the capital loan offer to a merchant at a time corresponding to an optimal time for offering the merchant a capital loan.

FIG. 5 illustrates an example process 500 generating a capital loan offer and providing the capital loan offer to a merchant at a time corresponding to an optimal time for offering the merchant a capital loan, such as to maximize an acceptance of the capital loan and/or to maximize a benefit of the loan.

Block 502 illustrates receiving merchant data and/or transaction data associated with a merchant. The merchant data may include a type of merchant, a size of merchant (e.g., a number of employees, a number of point of sale devices used by the merchant, square footage of brick and mortar store, etc.), merchant appointments, inventory (e.g., types of goods and services, amounts of products sold, turnover rate, sales velocity, profit margins, etc.), processing patterns, a type of point of sale device used by the merchant, a location associated with the merchant, customer data (e.g., frequent customers, rewards programs, customer demographics, etc.), employee data (e.g., roster, payroll data, demographics, commissions, etc.), and/or any other information used to describe the merchant and/or merchant business. The transaction data may include sales data (e.g., frequency of sales, amount per sale, average sale value, most frequent product sold, etc.), products sold concurrently, payment methods, and any other data related to one or more transactions performed by the merchant. In various examples, the service computing device may receive the merchant data and/or the transaction data from merchant computing device(s) responsive to the merchant establishing an account and/or signing up for a service offered by a service provider associated with a service computing device.

In some examples, the service computing device may be configured to receive the merchant data and/or the transaction data and store it in a data store. In some examples, the service computing device may associate the merchant and/or the transaction data with a merchant account. In some examples, the service computing device may determine that the merchant is a new merchant, and responsive to receiving the merchant data and/or transaction data, may generate a merchant account associated with the merchant.

Block 504 illustrates identifying merchant characteristics associated with the merchant. In some examples, the merchant characteristics may be based on the merchant data and/or the transaction data. In some examples, the merchant characteristics may be based, at least in part, on economy data.

In some examples, the service computing device be configured to assign the merchant to a merchant group based on the merchant characteristics. In such examples, the service computing device may associate merchants with similar characteristics in the merchant group (e.g., similarly situated merchants). In various examples, the service computing device may utilize machine learning techniques, such as clustering, to assign the merchant to the merchant group. In some examples, the assignment to the merchant group may be based on the merchants sharing a number of merchant characteristics (e.g., 5, 10, 15, etc.), merchants sharing a set of merchant characteristics (e.g., merchant type, inventory, size, etc.), merchants sharing a pre-determined percentage of merchant characteristics, or the like.

In various examples, the service computing device may be configured to periodically and/or at random interval (e.g., at a random time) reassign merchants to different merchant groups. In some examples, the service computing device may reassign merchants to different merchant groups based on a determination that one or more relevant characteristics that define the merchant group has changed. For example, a first set of merchant groups may be defined based on the relevant characteristics of merchant size, inventory, profit margin, and location. The service computing device may determine that a number of employees is an additional relevant characteristic of merchants used to define the merchant groups. The service computing device may reassign merchants to different groups based on the merchant size, inventory, profit margin, location, and number of employees.

In some examples, the service computing device may reassign a particular merchant to a different merchant group based on a determination that one or more merchant characteristics of the particular merchant has changed. For example, the service computing device may assign a first merchant to a first merchant group merchants based on an inventory and size associated with the first merchant. The service computing device may later determine that the merchant has changed inventory. The service computing device may, based on the determination of inventory change, reassign the merchant to a second merchant group.

Block 506 illustrates determining whether to delay timing (e.g., determine a delay period) for sending an offer. In some examples, the option to delay timing may be based at least in part on a determination that the merchant characteristics are associated with a merchant group. In such examples, the service computing device may determine to delay timing for sending the offer based on an analysis of capital loans previously offered to merchants in the merchant group.

At block 508, the service computing device determines to delay timing, and determines a delay period. In various examples, the service computing device may analyze the capital loans previously offered to the merchants in the merchant group, and may determine the delay period. In such examples, the service computing device may determine to delay timing for generating and/or sending a capital loan offer. For example, the merchant may have recently onboarded to a service provided by the service computing device. The service computing device may analyze merchant characteristics and determine that similarly situated merchants experienced increased growth from capital loans after one year of being in business. Based on the determination that increased growth occurs after one year, the service computing device may determine to delay timing for sending the offer.

Block 510 illustrates generating the capital loan offer. In various examples, the service computing device may generate the capital loan offer after the delay period has ended. In some examples, the service computing device may generate the capital loan offer based on a determination not to delay timing. The service computing device may generate the capital loan offer to maximize a business growth (e.g., success of the loan) and/or acceptance rate. In various examples, the loan characteristics (e.g., terms/conditions, loan period, fees, percentage rate for repayment, amount of money, etc.) of the capital loan offer may be based on merchant characteristics, loan data, and/or success data corresponding to loans previously offered to similarly situated merchants. In such examples, the loan data may include loan characteristics, times associated with loan offers, acceptance, declination, terms/conditions, times between the loan offers and either acceptance or declination, additional information provided to the merchants with the loan offers (e.g., statistics about loans previously offered), delivery channels, or the like. In various examples, the service computing device may analyze the merchant characteristics, loan data, and/or success data to determine the predictive factor(s) described above. In such examples, the service computing device may generate the capital loan offer based on the predictive factor(s). In various examples, the service computing device may utilize machine learning techniques to determine the loan characteristics.

Block 512 illustrates determining a time at which to provide the capital loan offer to the merchant. The time may correspond to an optimal time for offering the merchant a capital loan, such as to maximize an acceptance of the capital loan and/or to maximize a benefit of the loan (e.g., business growth) to a business associated with the merchant. In various examples, the time may be based on merchant characteristics, loan data, and/or success data corresponding to loans previously offered to similarly situated merchants (e.g., merchants in a same or similar merchant group, merchants sharing a threshold number or percentage of merchant characteristics with the merchant, etc.). In such examples, the loan data may include loan characteristics (e.g., terms/conditions, loan period, fees, percentage rate for repayment, amount of money, etc.), data corresponding to acceptance, declination, a time between the loan offer and either acceptance or declination, and/or additional information provided to the merchant with the loan offer (e.g., statistics about loans previously offered), a delivery channel, or the like. The success data may include a growth in a merchant business, a rate of acceptance of previously offered loans, and/or any other data that may be indicative of a successful loan.

In various examples, the service computing device may determine one or more predictive factors of a successful loan associated with timing, such as utilizing machine learning mechanisms. In such examples, the service computing device may use predictive factor(s) to determine the time at which to provide the capital loan offer to the merchant. For example, the merchant may be a shoe merchant and the service computing device may determine that loans offered to shoe merchants between October $16^{th}$ and October $30^{th}$ has resulted in business growth. Based on the determination, the service computing device may determine that the capital loan offer should be offered to the merchant between the $16^{th}$ and the $30^{th}$.

Block 514 illustrates sending the capital loan offer to the merchant at the time. In various examples, the service computing device may send the capital loan offer to the merchant via a channel (e.g., traditional mail, email, text, notification via an application, dashboard, telephone call, etc.). In some examples, the service computing device may send the capital loan offer via a pre-determined channel. In at least one example, the service computing device may determine the channel via which to send the capital loan offer. In some examples, the service computing device may analyze the merchant characteristics, loan data, and/or success data corresponding to loans previously offered to similarly situated merchants. In such examples, the service computing device may identify one or more channels corresponding to a high acceptance rate of the previously offered loans.

Figure 6:
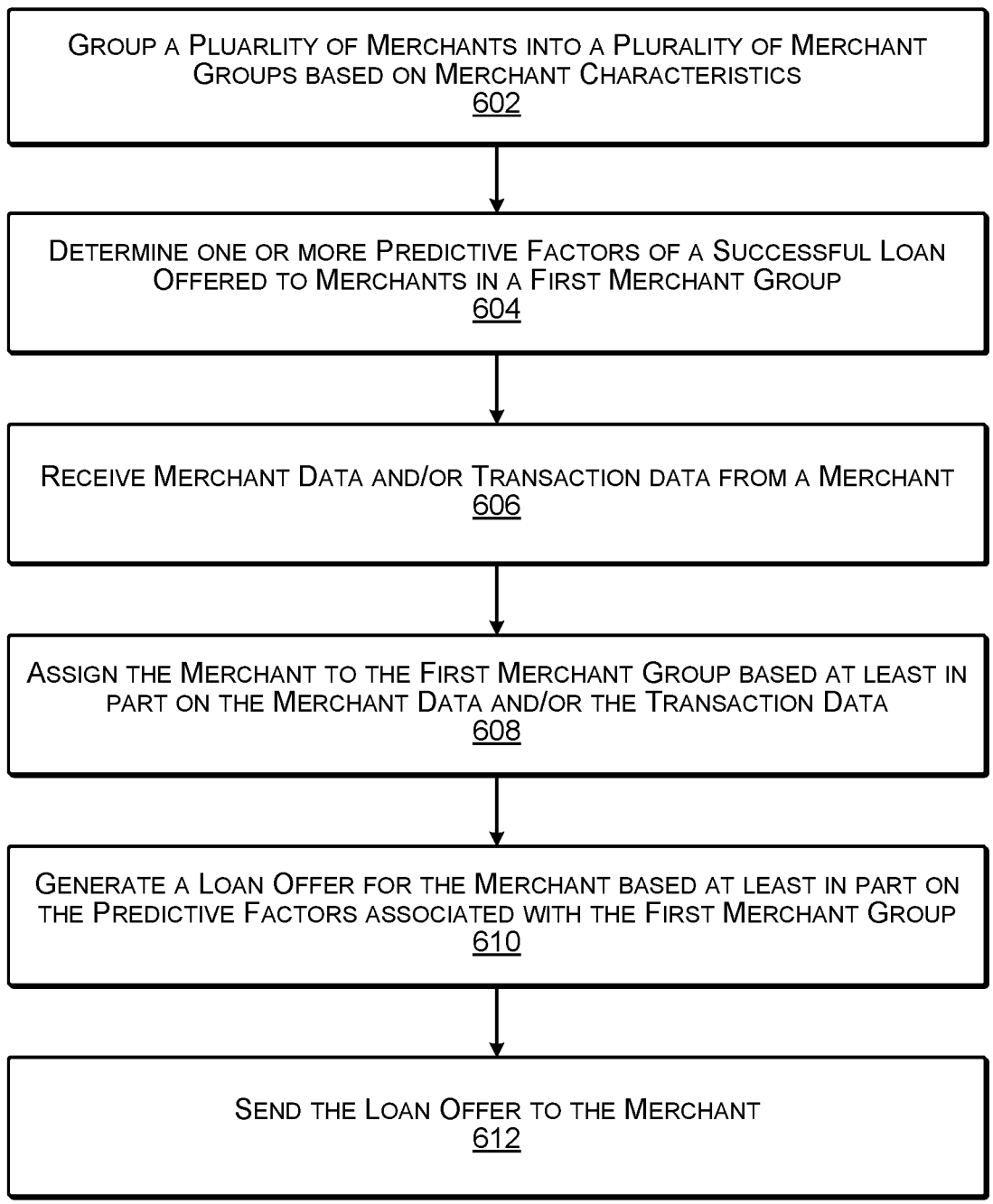
FIG. 6 is a flow diagram illustrating an example process for determining one or more predictive factors associated with successful loans, and generating a loan offer for a merchant based on the predictive factors.

FIG. 6 illustrates an example process 600 for determining one or more predictive factors associated with successful loans, and generating a loan offer for a merchant based on the predictive factors.

Block 602 illustrates grouping a plurality of merchants into a plurality of merchant groups based on merchant characteristics. The service computing device may associate merchants with similar characteristics in a merchant group (e.g., similarly situated merchants). In various examples, the service computing device may utilize machine learning techniques, such as clustering, to assign the merchant to the merchant group. In some examples, the assignment to the merchant group may be based on the merchants sharing a number of merchant characteristics (e.g., 5, 10, 15, etc.), merchants sharing a set of merchant characteristics (e.g., merchant type, inventory, size, etc.), merchants sharing a pre-determined percentage of merchant characteristics, or the like.

In various examples, the service computing device may be configured to periodically and/or at random interval reassign merchants to different merchant groups. In some examples, the service computing device may reassign merchants to different merchant groups based on a determination that one or more relevant characteristics that define the merchant group has changed. In some examples, the service computing device may reassign a particular merchant to a different merchant group based on a determination that one or more merchant characteristics of the particular merchant has changed.

Block 604 illustrates determining one or more predictive factors of successful loans offered to merchants in a first merchant group. The predictive factors may include merchant characteristics, loan data (e.g., loan characteristics, a time to offer the loan, a loan offer period (e.g., a period of time to allow acceptance), and/or economy data corresponding to successful loans (e.g., high growth rate, high acceptance rate, etc.). In various examples, the service computing device may analyze merchant characteristics, loan data, economy data and/or success data corresponding to loans previously offered to merchants in the first merchant group, and may determine predictive factor(s) of successful loans. The loan data may include loan characteristics (e.g., terms/conditions, loan period, fees, percentage rate for repayment, amount of money, etc.), data corresponding to acceptance, declination, a time between the loan offer and either acceptance or declination, and/or additional information provided to the merchant with the loan offer (e.g., statistics about loans previously offered), a delivery channel, or the like. The success data may include a growth in a merchant business, a rate of acceptance of previously offered loans, and/or any other data that may be indicative of a successful loan.

In various examples, the service computing device may determine one or more predictive factors of a successful loan associated with timing, such as utilizing machine learning mechanisms. In such examples, the service computing device may use predictive factor(s) to determine the time at which to provide the capital loan offer to the merchant. For example, the merchant may be a coffee shop merchant and the service computing device may determine that loans offered to coffee shop merchants between November 1 and November 30 has resulted in business growth. Based on the determination, the service computing device may determine that the capital loan offer should be offered to the merchant between November 1 and November 30.

Block 606 illustrates receiving merchant data and/or transaction data from a merchant. In some examples, the merchant may be an existing merchant (e.g., previously associated with a service provider). The merchant may send the merchant data and/or transaction data to the service computing device in the course of business, and/or specifically to adjust a merchant account. In some examples, the merchant may be a new merchant, such as a merchant new to a service provided by the service provider. In such examples, the service computing device may be configured to determine that the merchant is new based on the merchant data and/or transaction data. In various examples, the service computing device may generate (e.g., build) a merchant account for the merchant using the merchant data and/or transaction data. In some examples, the service computing device may receive the merchant data and/or transaction at a time that the merchant is onboarding to a service provided by the service provider. For example, the merchant may initiate a first instance of a merchant application, and may submit merchant data via the merchant application, such as, for example, a merchant name, type, inventory, employee information, etc. The service computing device may receive the merchant data, and may store the merchant data in a data store, such as in a merchant account.

Block 608 illustrates assigning the merchant to the first merchant group based at least in part on the merchant data and/or transaction data. In various examples, the service computing device may assign the merchant to the first merchant group based on a determination that the merchant and the first group of merchants share a number of characteristics, a percentage of similar merchant characteristics, a set of specific merchant characteristics, and/or economy data related to the merchants. In various examples, the service computing device may utilize machine learning techniques and/or statistical analysis to group merchants.

In various examples, the service computing device may calculate a similarity score for the merchant. The similarity score may represent a similarity of the merchant to other merchants in the group. In some examples, the service computing device may assign the merchant to the first merchant group based on the similarity score exceeding a threshold score.

Block 610 illustrates generating a capital loan offer for the merchant based at least in part on the predictive factors associated with the first merchant group. The service computing device may generate the capital loan offer to maximize a business growth (e.g., success of the loan) and/or acceptance rate. In various examples, the loan characteristics (e.g., terms/conditions, loan period, fees, percentage rate for repayment, amount of money, etc.) of the capital loan offer may be based on merchant characteristics, loan data, and/or success data corresponding to loans previously offered to similarly situated merchants. In such examples, the loan data may include loan characteristics, times associated with loan offers, acceptance, declination, terms/conditions, times between the loan offers and either acceptance or declination, additional information provided to the merchants with the loan offers (e.g., statistics about loans previously offered), delivery channels, or the like. In various examples, the service computing device may analyze the merchant characteristics, loan data, and/or success data to determine the predictive factor(s) described above. In such examples, the service computing device may generate the loan offer based on the predictive factor(s). In various examples, the service computing device may utilize machine learning techniques to determine the loan characteristics.

Block 612 illustrates sending the loan offer to the merchant via a channel. The channel may be traditional mail, email, text, notification on merchant application, dashboard, telephone, or any other channel via which a loan offer may be sent. In some examples, the service computing device may send the loan offer via one or more channels. In various examples, the service computing device may be configured to determine optimal channel(s) for delivering the loan offer. The optimal channel(s) may be channels determined to have higher acceptance rates associated therewith. In various examples, the service computing device may analyze channels associated with loans previously offered to merchants of the first merchant group. The channels associated with a high acceptance rate may be determined to be optimal channels. In some examples, the service computing device may determine the optimal channel(s) utilizing machine learning techniques and/or statistical analyses.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   one or more processors;
   one or more computer-readable media storing instructions executable by the one or more processors to configure the one or more processors to perform operations comprising:
      receiving merchant data related to a merchant of a plurality of merchants, wherein the merchant data comprises one or more merchant characteristics associated with the merchant;
      assigning the merchant to a first group of merchants based at least in part on the merchant sharing at least one merchant characteristic with merchants in the first group of merchants;
      determining, utilizing a machine learning model that is trained to determine optimal timings for providing loan offers based on merchant data associated with respective merchants of the first group, an optimal timing at which to provide a loan offer to the merchant,
      wherein the machine learning model is trained to determine the optimal timings based at least in part on (i) identifying, from merchants in the first group of merchants that received a loan offer in the past, a subset of the merchants in the first group that, during a period following acceptance of a respective loan offer, had a change that satisfied a threshold for at least one financial parameter indicative of a respective business of a respective merchant in the subset, (ii) determining respective initial offer timings of the respective loan offers for the respective merchants in the subset of the merchants, and (iii) determining respective optimal timings based at least in part on the respective initial offer timings for the respective merchants in the subset of the merchants in the first group; and
      sending the loan offer to a computing device of the merchant based at least in part on the optimal timing determined for the loan offer for the merchant.

2. The system as recited in claim 1, the operations further comprising:
   receiving additional merchant data from the merchant, wherein the additional merchant data comprises additional information regarding the one or more merchant characteristics associated with the merchant; and
   based at least on the additional information regarding the one or more merchant characteristics associated with the merchant, reassigning the merchant from the first group of merchants to a second group of merchants of the plurality merchants, the second group comprising one more merchants not included in the first group.

3. The system as recited in claim 1, the operations further comprising:
   determining an additional merchant characteristic to use for grouping merchants of the plurality of merchants; and
   based at least on the additional merchant characteristic, reassigning the merchant from the first group of merchants to a second group of merchants of the plurality merchants, the second group comprising one more merchants not included in the first group.

4. The system as recited in claim 1, the operation of assigning the merchant to the first group of merchants based at least in part on the merchant sharing at least one merchant characteristic with merchants in the first group of merchants further comprising:
   using a grouping data model to assign respective merchants of the plurality of merchants to respective merchant groups based at least on respective merchant data associated with the respective merchants, the grouping data model having been trained via a machine learning mechanism.

5. The system as recited in claim 1, the operations further comprising:
   providing financing to the merchant based on receiving, from the computing device of the merchant, an acceptance of the loan offer;
   subsequent to the acceptance of the loan offer by the merchant, determining a growth of the at least one financial parameter indicative of a business of the merchant;
   sending a subsequent loan offer to the computing device of the merchant based at least in part on determining the growth.

6. The system as recited in claim 1, the operations further comprising:
   determining channels associated with loans previously offered to the merchants in the first group of merchants; and
   identifying a channel corresponding to a highest acceptance rate of loans previously offered to the merchants in the first group of merchants, wherein sending the loan offer to the computing device of the merchant includes sending the loan offer via the identified channel.

7. The system as recited in claim 1, wherein, for sending the loan offer to the computing device of the merchant, the one or more processors are further configured to perform operations comprising:
   generating, based at least in part on at least one output of the machine learning model, a message to the merchant, the message including information related to the loan offer and the optimal timing determined for the loan offer for the merchant.

8. The system as recited in claim 7, wherein, based on the at least one output of the machine learning model, the one or more processors are further configured to perform operations comprising:
   including, with the generated message to the merchant, one or more statistics determined to be related to businesses of other merchants that received loans.

9. The system as recited in claim 1, wherein, based on at least one output of the machine learning model, the one or more processors generate the loan offer for the merchant, including at least one of a loan amount or repayment terms for the merchant.

10. A method comprising:
    receiving, by one or more processors, merchant data related to a merchant of a plurality of merchants, wherein the merchant data comprises one or more merchant characteristics associated with the merchant;
    assigning, by the one or more processors, the merchant to a first group of merchants based at least in part on the merchant sharing at least one merchant characteristic with merchants in the first group of merchants;
    determining, by the one or more processors, utilizing a machine learning model that is trained to determine optimal timings for providing loan offers based on merchant data associated with respective merchants of the first group, an optimal timing at which to provide a loan offer to the merchant,
    wherein the machine learning model is trained to determine the optimal timings based at least in part on (i) identifying, from merchants in the first group of merchants that received a loan offer in the past, a subset of the merchants in the first group that, during a period following acceptance of a respective loan offer, had a change that satisfied a threshold for at least one financial parameter indicative of a respective business of a respective merchant in the subset, (ii) determining respective initial offer timings of the respective loan offers for the respective merchants in the subset of the merchants, and (iii) determining respective optimal timings based at least in part on the respective initial offer timings for the respective merchants in the subset of the merchants in the first group; and
    sending, by the one or more processors, the loan offer to a computing device of the merchant based at least in part on the optimal timing determined for the loan offer for the merchant.

11. The method as recited in claim 10, further comprising:
    receiving additional merchant data from the merchant, wherein the additional merchant data comprises additional information regarding the one or more merchant characteristics associated with the merchant; and
    based at least on the additional information regarding the one or more merchant characteristics associated with the merchant, reassigning the merchant from the first group of merchants to a second group of merchants of the plurality merchants, the second group comprising one more merchants not included in the first group.

12. The method as recited in claim 10, further comprising:
    determining an additional merchant characteristic to use for grouping merchants of the plurality of merchants; and
    based at least on the additional merchant characteristic, reassigning the merchant from the first group of merchants to a second group of merchants of the plurality merchants, the second group comprising one more merchants not included in the first group.

13. The method as recited in claim 10, wherein the assigning the merchant to the first group of merchants based at least in part on the merchant sharing at least one merchant characteristic with merchants in the first group of merchants further comprises:
    using a grouping data model to assign respective merchants of the plurality of merchants to respective merchant groups based at least on respective merchant data associated with the respective merchants, the grouping data model having been trained via a machine learning mechanism.

14. The method as recited in claim 10, further comprising:
    providing financing to the merchant based on receiving, from the computing device of the merchant, an acceptance of the loan offer;
    subsequent to the acceptance of the loan offer by the merchant, determining a growth of the at least one financial parameter indicative of a business of the merchant;
    sending a subsequent loan offer to the computing device of the first merchant based at least in part on determining the growth.

15. The method as recited in claim 10, further comprising:
- determining channels associated with loans previously offered to the merchants in the first group of merchants; and
- identifying a channel corresponding to a highest acceptance rate of loans previously offered to the merchants in the first group of merchants, wherein sending the loan offer to the computing device of the merchant includes sending the loan offer via the identified channel.

16. One or more non-transitory computer-readable media storing instructions executable by one or more processors to configure the one or more processors to perform operation comprising:
- receiving merchant data related to a merchant of a plurality of merchants, wherein the merchant data comprises one or more merchant characteristics associated with the merchant;
- assigning the merchant to a first group of merchants based at least in part on the merchant sharing at least one merchant characteristic with merchants in the first group of merchants;
- determining, utilizing a machine learning model that is trained to determine optimal timings for providing loan offers based on merchant data associated with respective merchants of the first group an optimal timing at which to provide a loan offer to the merchant,
- wherein the machine learning model is trained to determine the optimal timings based at least in part on (i) identifying, from merchants in the first group of merchants that received a loan offer in the past, a subset of the merchants in the first group that, during a period following acceptance of a respective loan offer, had a change that satisfied a threshold for at least one financial parameter indicative of a respective business of a respective merchant in the subset, (ii) determining respective initial offer timings of the respective loan offers for the respective merchants in the subset of the merchants, and (iii) determining respective optimal timings based at least in part on the respective initial offer timings for the respective merchants in the subset of the merchants in the first group; and
- sending the loan offer to a computing device of the merchant based at least in part on the optimal timing determined for the loan offer for the merchant.

17. The one or more non-transitory computer-readable media as recited in claim 16, the operations further comprising:
- receiving additional merchant data from the merchant, wherein the additional merchant data comprises additional information regarding the one or more merchant characteristics associated with the merchant; and
- based at least on the additional information regarding the one or more merchant characteristics associated with the merchant, reassigning the merchant from the first group of merchants to a second group of merchants of the plurality merchants, the second group comprising one more merchants not included in the first group.

18. The one or more non-transitory computer-readable media as recited in claim 16, the operations further comprising:
- determining an additional merchant characteristic to use for grouping merchants of the plurality of merchants; and
- based at least on the additional merchant characteristic, reassigning the merchant from the first group of merchants to a second group of merchants of the plurality merchants, the second group comprising one more merchants not included in the first group.

19. The one or more non-transitory computer-readable media as recited in claim 16, the operation of assigning the merchant to the first group of merchants based at least in part on the merchant sharing at least one merchant characteristic with merchants in the first group of merchants further comprising:
- using a grouping data model to assign respective merchants of the plurality of merchants to respective merchant groups based at least on respective merchant data associated with the respective merchants, the grouping data model having been trained via a machine learning mechanism.

20. The one or more non-transitory computer-readable media as recited in claim 16, the operations further comprising:
- determining channels associated with loans previously offered to the merchants in the first group of merchants; and
- identifying a channel corresponding to a highest acceptance rate of loans previously offered to the merchants in the first group of merchants, wherein sending the loan offer to the computing device of the merchant includes sending the loan offer via the identified channel.

* * * * *